(12) United States Patent
Chen et al.

(10) Patent No.: US 8,251,382 B2
(45) Date of Patent: Aug. 28, 2012

(54) STROLLER AND SEAT ASSEMBLY MECHANISM FOR A STROLLER

(75) Inventors: Shun-Min Chen, Taipei (TW); Ze-Hua Yi, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 258 days.

(21) Appl. No.: 12/134,199

(22) Filed: Jun. 6, 2008

(65) Prior Publication Data

US 2008/0303232 A1 Dec. 11, 2008

Related U.S. Application Data

(60) Provisional application No. 60/948,992, filed on Jul. 11, 2007.

(30) Foreign Application Priority Data

Jun. 6, 2007 (CN) ............. 2007 2 0148181 U
Mar. 10, 2008 (CN) ............. 2008 2 0008307 U

(51) Int. Cl.
*B62B 9/28* (2006.01)

(52) U.S. Cl. ............. 280/47.41; 280/47.38

(58) Field of Classification Search ......... 280/47.39, 280/47.38, 47.41, 642, 643, 647, 648; 297/325, 297/326, 327

See application file for complete search history.

(56) References Cited

U.S. PATENT DOCUMENTS

| | | | | |
|---|---|---|---|---|
| 4,645,371 A * | 2/1987 | Wang | | 403/93 |
| 5,028,061 A * | 7/1991 | Hawkes | | 280/47.4 |
| 5,257,799 A * | 11/1993 | Cone et al. | | 280/642 |
| 5,364,137 A * | 11/1994 | Shimer | | 297/327 |
| 5,676,386 A * | 10/1997 | Huang | | 280/30 |
| 5,772,279 A * | 6/1998 | Johnson, Jr. | | 297/130 |
| 5,865,447 A * | 2/1999 | Huang | | 280/30 |
| 5,947,555 A * | 9/1999 | Welsh et al. | | 297/130 |
| 6,286,844 B1 * | 9/2001 | Cone et al. | | 280/47.41 |
| 6,446,990 B1 * | 9/2002 | Nania et al. | | 280/47.371 |
| 6,513,827 B1 * | 2/2003 | Barenbrug | | 280/648 |
| 6,991,248 B2 * | 1/2006 | Valdez et al. | | 280/647 |
| 7,032,922 B1 * | 4/2006 | Lan | | 280/648 |
| 7,296,820 B2 * | 11/2007 | Valdez et al. | | 280/647 |
| 7,314,247 B1 * | 1/2008 | Chen et al. | | 297/16.1 |
| 7,367,581 B2 * | 5/2008 | Yang | | 280/642 |
| 7,377,537 B2 * | 5/2008 | Li | | 280/650 |
| 7,584,985 B2 * | 9/2009 | You et al. | | 280/643 |
| 7,658,399 B2 * | 2/2010 | Van Dijk | | 280/642 |
| 7,681,894 B2 * | 3/2010 | Santamaria | | 280/47.38 |
| 7,686,323 B2 * | 3/2010 | Chen | | 280/642 |
| 7,694,996 B2 * | 4/2010 | Saville et al. | | 280/642 |
| 7,712,765 B2 * | 5/2010 | Chen et al. | | 280/642 |
| 7,753,398 B2 * | 7/2010 | Yang | | 280/642 |

(Continued)

*Primary Examiner* — Jeffrey J Restifo
(74) *Attorney, Agent, or Firm* — Winston Hsu; Scott Margo

(57) ABSTRACT

A seat assembly mechanism for a stroller has a seat frame and a main frame. The seat assembly mechanism includes a positioning device and a seat supporting member. The positioning device is disposed on the seat frame and includes a positioning pin movable between a locking position and a releasing position. The seat supporting member is disposed on the main frame, and includes a positioning-device recipient corresponding to the positioning device and a positioning groove located at a side of the positioning-device recipient. Furthermore, the positioning device is detachably assembled to the seat supporting member, and the positioning pin inserts into the positioning groove when the positioning device is disposed in the positioning-device recipient of the seat supporting member for assembling the seat frame to the main frame.

21 Claims, 27 Drawing Sheets

U.S. PATENT DOCUMENTS

| | | | |
|---|---|---|---|
| 2008/0150247 A1* | 6/2008 | Lake | 280/47.41 |
| 2008/0179848 A1* | 7/2008 | Lake | 280/47.41 |
| 2008/0224451 A1* | 9/2008 | Vegt | 280/642 |
| 2008/0303232 A1* | 12/2008 | Chen et al. | 280/47.41 |
| 2009/0102162 A1* | 4/2009 | Chen | 280/642 |
| 2009/0121455 A1* | 5/2009 | Kretschmer et al. | 280/642 |
| 2009/0256323 A1* | 10/2009 | Mostert et al. | 280/47.38 |
| 2010/0001492 A1* | 1/2010 | Driessen | 280/642 |
| 2010/0109272 A1* | 5/2010 | Ahnert et al. | 280/47.38 |
| 2010/0127480 A1* | 5/2010 | Ahnert et al. | 280/647 |

* cited by examiner

STROLLER AND SEAT ASSEMBLY MECHANISM FOR A STROLLER

CROSS REFERENCE TO RELATED APPLICATIONS

This application claims the benefit of U.S. Provisional Application No. 60/948,992, filed on Jul. 11, 2007 and entitled "Seat Connecting Device for Stroller" the contents of which are incorporated herein by reference.

BACKGROUND OF THE INVENTION

1. Field of the Invention

The present invention relates to a seat assembly mechanism, and more specifically, to a seat assembly mechanism for a stroller.

2. Description of the Prior Art

With reference to FIG. 1, a stroller 1 comprises a main frame 3, a plurality of wheels 4 connected beneath the main frame 3, a detachable seat frame 5 attached to the main frame 3, and a seat assembly mechanism 6 respectively disposed on the main frame 3 correspondent to the seat frame 5 to connect the main frame 3 and the seat frame 5 together. The seat assembly mechanism 6 can adjust the inclination of the seat frame 5, and the seat frame 5 is reversible which can face the front and the back of the stroller 1 according to users' needs. However, the stroller 1 mentioned above does not have an inclination safety device and cannot prevent the seat frame 5 from over-inclining, which endangers the baby. The stroller 1 also does not have a self-righting device. The seat assembly mechanism 6 does not automatically return to its original state after the seat frame 5 is detached from the main frame 3 at an inclined angle. Thus, it is inconvenient for a user to re-install the seat frame 5 back to the main frame 3 since the user has to keep the seat frame 5 at the inclined angle while assembling the seat frame 5 to the main frame 3.

SUMMARY OF THE INVENTION

The present invention provides a seat assembly mechanism for a stroller having a seat frame and a main frame, the seat assembly mechanism comprising a positioning device disposed on the seat frame, the positioning device comprising a positioning pin movable between a locking position and a releasing position; and a seat supporting member disposed on the main frame, the seat supporting member comprising a positioning-device recipient corresponding to the positioning device and a positioning groove located at a side of the positioning-device recipient; wherein the positioning device is detachably assembled to the seat supporting member, and the positioning pin inserts into the positioning groove when the positioning device is disposed in the positioning-device recipient of the seat supporting member for assembling the seat frame to the main frame.

The present invention further provides a stroller comprising a seat frame comprising a positioning device, the positioning device comprising a positioning pin movable between a locking position and a releasing position; and a main frame comprising a seat supporting member, the seat supporting member having a positioning-device recipient for removably receiving the positioning device of the seat frame and a positioning groove located at a side of the positioning-device recipient; wherein when the positioning device is disposed in the positioning-device recipient, the positioning pin is engaged with the positioning groove for fixing the seat frame on the main frame.

These and other objectives of the present invention will no doubt become obvious to those of ordinary skill in the art after reading the following detailed description of the preferred embodiment that is illustrated in the various figures and drawings.

DETAILED DESCRIPTION

Further description for a seat assembly mechanism for a stroller according to the present invention is provided as follows with reference to the attached drawings.

Figure 1:
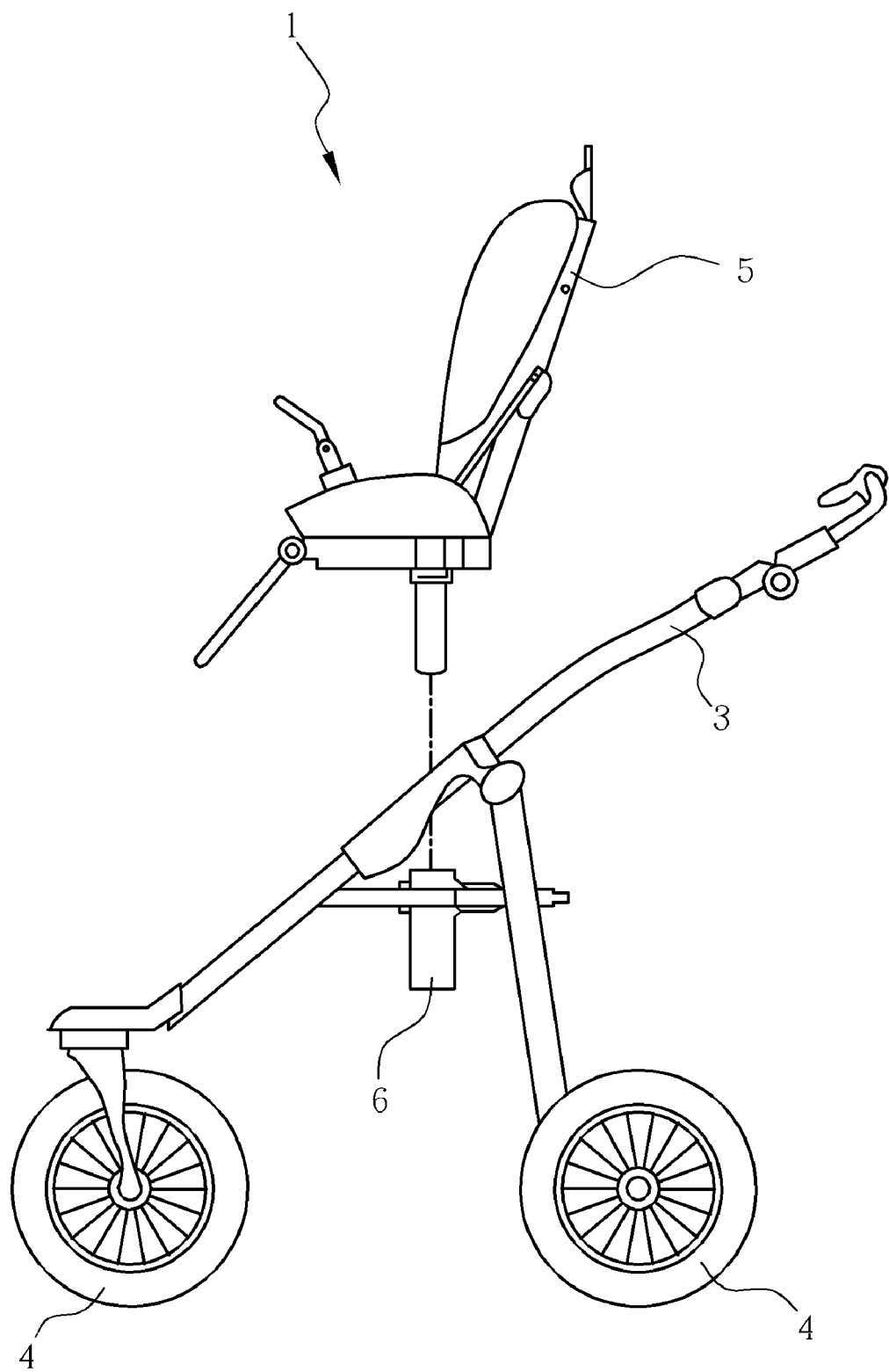
FIG. 1 is a schematic view showing a conventional stroller.
Figure 2:
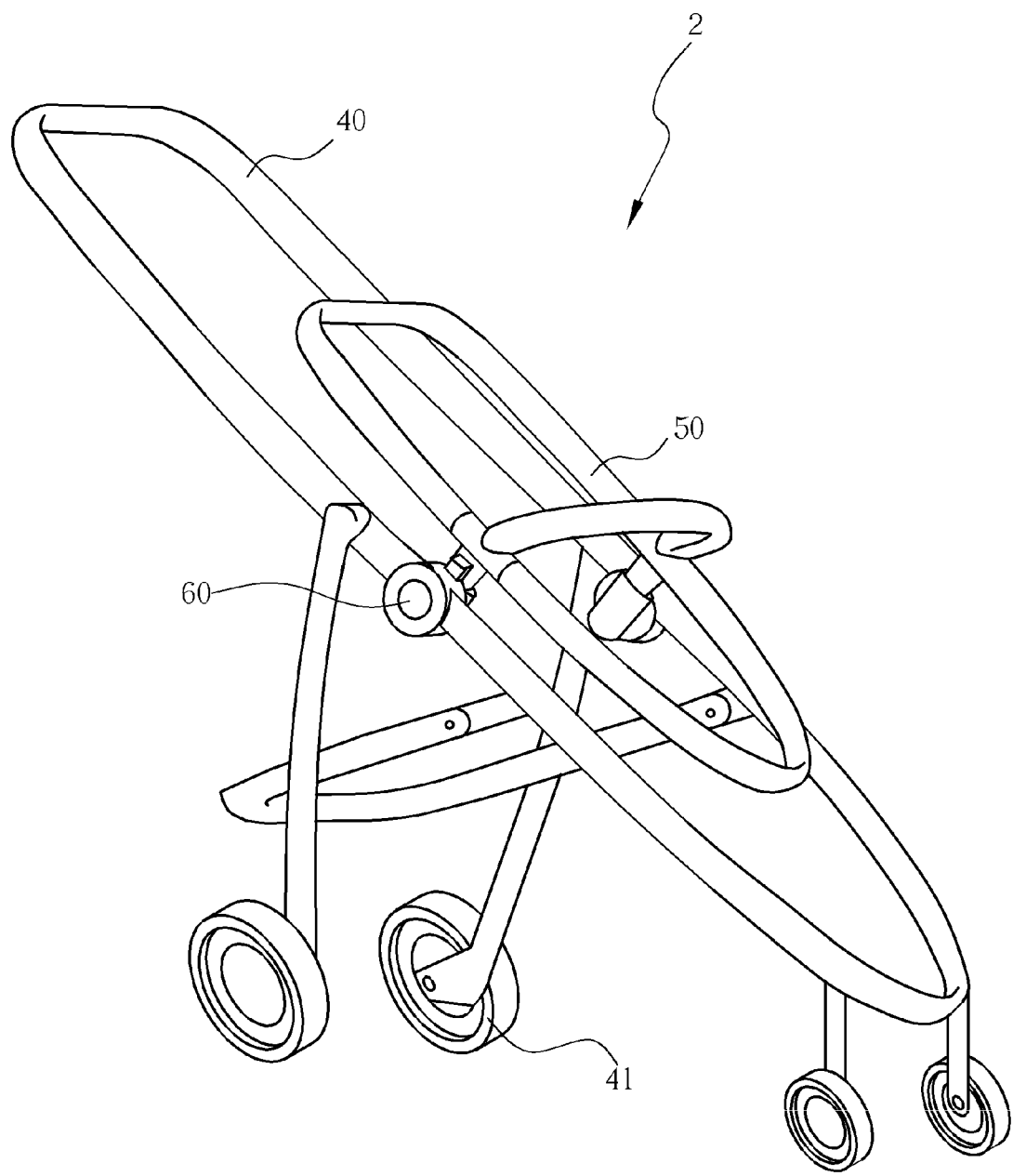
FIG. 2 is a schematic view showing a stroller equipped with seat assembly mechanisms according to the present invention.
Figure 3:
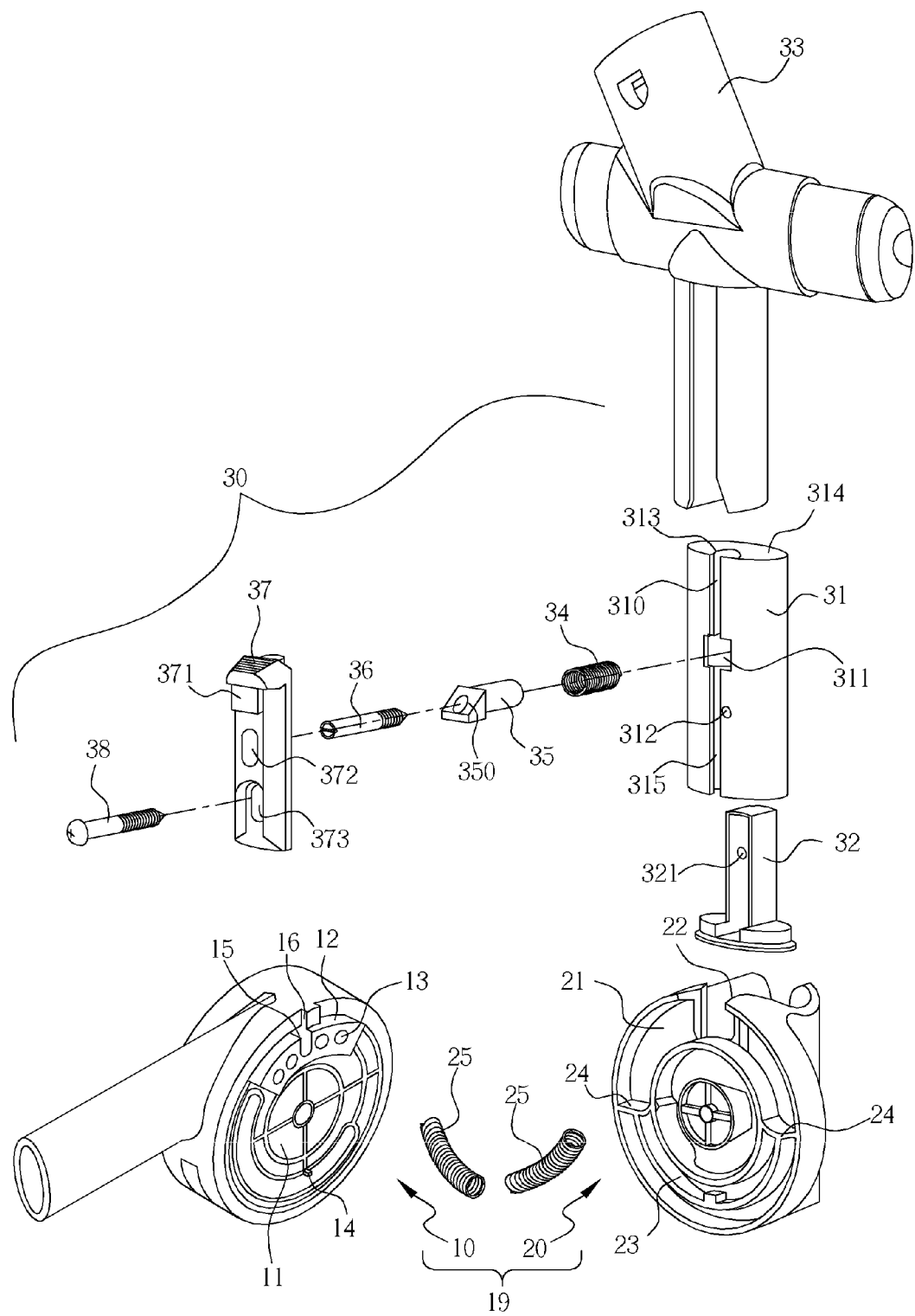
FIG. 3 is an exploded view showing a seat assembly mechanism at the right side of the stroller according to the present invention.
Figure 3A:
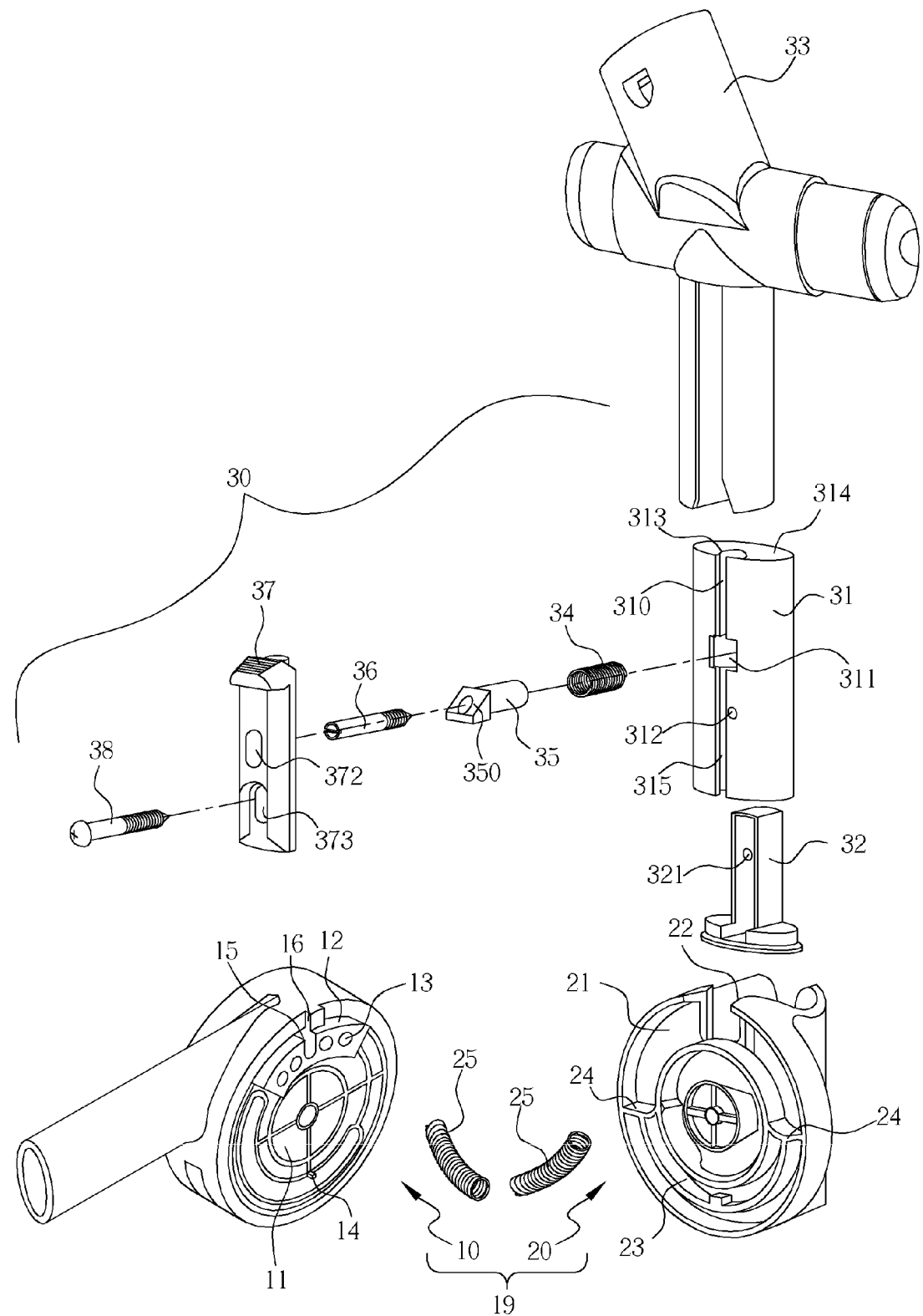
FIG. 3A is an exploded view showing a seat assembly mechanism at the left side of the stroller according to the present invention.
Figure 4:
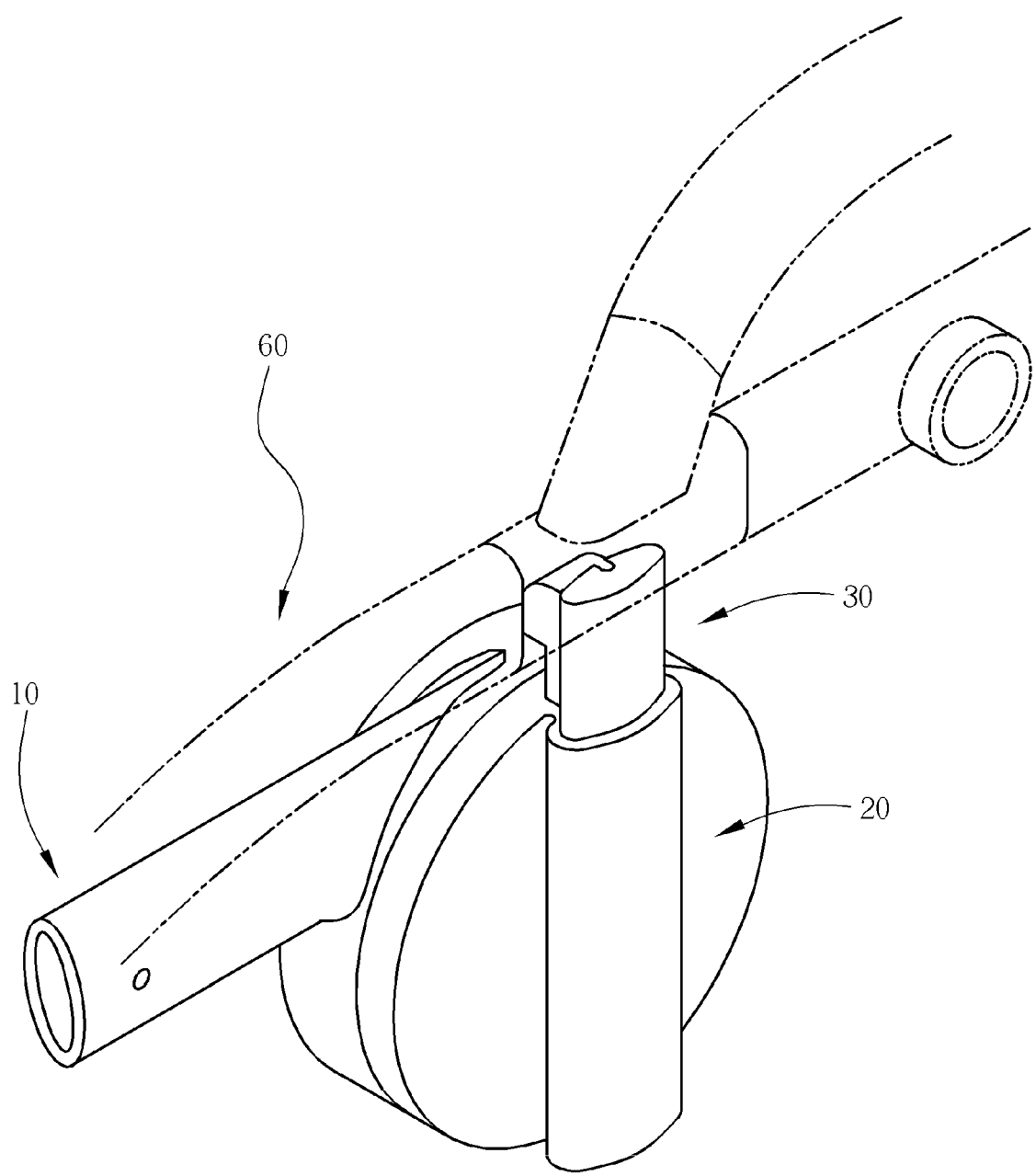
FIG. 4 is an assembly view showing the seat assembly mechanism at the left side of the stroller.

With reference to FIG. 2, a stroller 2 according to the present invention comprises a main frame 40 and a seat frame 50 connected with the main frame 40 by a seat assembly mechanism 60. The front portion of the main frame 40 has front legs and the back portion of the main frame 40 has rear legs. Each of the front legs and the rear legs is provided with a wheel 41. The seat assembly mechanisms 60 are disposed at the left and right sides of the stroller 2 respectively. FIGS. 3 and 3A show the seat assembly mechanism 60 disposed at the right side and the left side of the stroller 2 respectively. Each seat assembly mechanism 60 comprises a seat supporting member 19 disposed on the main frame 40 and a positioning device 30 disposed on the seat frame 50. The seat supporting member 19 comprises a pivot base 10, and a seat supporting base 20 pivotally connected to the pivot base 10. The upper part of the main frame 40 comprises a handle and lower part of the main frame 40 comprises front legs. The pivot bases 10 pivotally connect the handle with the front legs, and the handle is pivotally connected to the rear legs. The positioning device 30 is mounted on the seat frame 50, and the seat supporting member 19 is mounted on the main frame 40. Therefore, the seat frame 50 can be easily assembled with or detached from the main frame 40 via the positioning device 30. Furthermore, the inclined angle of the seat frame 50 can be adjusted, and the seat frame 50 is reversible to face forward or backward. Also, no matter what the inclined angle of the seat frame 50 is as it is removed from the main frame 40, the seat frame 50 can still be re-assembled with the main frame 40 at a horizontal state.

In the following, the seat assembly mechanism 60 disposed at the right side of the stroller 2 according to the present invention will be described in detail. The seat assembly mechanism 60 at the left side of the stroller 2 is similar to the one at the right side of the stroller 2 except for a button 37.

Referring to FIG. 3, the seat assembly mechanism 60 comprises the positioning device 30, the pivot base 10, and the seat supporting base 20 pivotally connected to the pivot base 10. The positioning device 30 is assembled to a positioning-device recipient 22 of the seat supporting base 20.

The positioning device 30 comprises a hollow fixing sleeve 31, a seat connection portion 33, and a button 37 connected to the fixing sleeve 31.

The fixing sleeve 31 is provided with a partition 313 to divide the fixing sleeve 31 into a first mounting portion 315 and a second mounting portion 314. The seat connection portion 33 connected to the seat frame 50 is inserted into the second mounting portion 314.

The outer surface of the first mounting portion 315 is provided with a through guide groove 310 along the axial direction of the first mounting portion 315, and the inner wall of the guide groove 310 is provided with a first positioning hole 311 and a second positioning hole 312. A plug 32 has a thread hole 321 corresponding to the second positioning hole 312. Also, the plug 32 is inserted into the bottom end of the second mounting portion 314. After the plug 32 is completely inserted into the second mounting portion 314, the thread hole 321 of the plug 32 is aligned with the second positioning hole 312.

The button 37 is glided along the guide groove 310 and is secured to the first mounting portion 315 of the fixing sleeve 31. The upper and lower portions of the button 37 has an oval first positioning slot 372 and an oval second positioning slot 373 corresponding to the first positioning hole 311 and the second positioning hole 312, respectively. The upper wall of the first positioning slot 372 has a first inclined face 370 (as shown in FIG. 5A). The exterior of the upper portion of the button 37 at the right side of the stroller 2 is provided with a blocking section 371 extending downward (as shown in FIG. 3), but the button 37 at the left side of the stroller 2 is not provided with the blocking section 371 (as shown in FIG. 3A). After the button 37 is mounted to the first mounting portion 315 of the fixing sleeve 31, a second positioning rod 38 is inserted through the second positioning slot 373 of the button 37 and the second positioning hole 312 of the fixing sleeve 31. The second positioning rod 38 is then fixed in the thread hole 321 of the plug 32, thereby preventing the button 37 from separating from the fixing sleeve 31. Furthermore, A positioning pin comprises a hollow positioning sleeve 35 and a first positioning rod 36. The positioning sleeve 35 comprises a second inclined face 350 at one end thereof. Before the button 37 is mounted to the fixing sleeve 31, a spring 34 sleeves on the positioning sleeve 35 and the end of the positioning sleeve 35 without the second inclined face 350 is inserted into the first positioning hole 311. The positioning sleeve 35 receives the first positioning rod 36 inside. Because the first positioning rod 36 is longer than the positioning sleeve 35, one end of the first positioning rod 36 protrudes from the end of the positioning sleeve 35 having the second inclined face 350 and the other end of the first positioning rod 36 is fixed within the positioning sleeve 35. When the positioning sleeve 35 is assembled with the button 37, the second inclined face 350 corresponds to and abuts against the first inclined face 370. Thus, the positioning sleeve 35 and the first positioning rod 36 in the positioning sleeve 35 are retained in a locking position. Because the first positioning slot 372 and the second positioning slot 373 are oval-shaped, the first positioning rod 36 and the second positioning rod 38 are moved freely within. Thus, the button 37 can move along the guide groove 310 vertically. As the button 37 is pressed downward, the first inclined face 370 of the button 37 pushes the second inclined face 350 of the positioning sleeve 35 so as to compress the spring 34 and drive the positioning sleeve 35 to move toward the second mounting portion 314. Moreover, because the first positioning rod 36 is fixed with the positioning sleeve 35, the first positioning pin 36 also moves toward the second mounting portion 314 accordingly.

The pivot base 10 comprises a first connecting surface 11. The first connecting surface 11 is in a circular shape according to an embodiment of the present invention. The first connecting surface 11 comprises a protruding portion 12 at the upper part thereof and the protruding portion 12 has a plurality of positioning grooves 13. In the embodiment of the present invention, the protruding portion 12 has five positioning grooves 13. The positioning grooves 13 at the protruding portion 12 are distributed along the circumference of the pivot base 10. The protruding portion 12 comprises an inclined opening 15 that is formed above the middle positioning groove 13 and communicates with the middle positioning groove 13. A blocker 16 is disposed at a proper position of the first connecting surface 11 adjacent to the inclined opening 15, and a protruding piece 14 is formed at the lower portion of the first connecting surface 11.

Moreover, the seat supporting base 20 comprises a circular second connecting surface 21 corresponding to the first connecting surface 11 of the pivot base 10. Also, when assembling the pivot base 10 with the seat supporting base 20, the first connecting surface 11 pivotally connects with the second connecting surface 21. The seat supporting base 20 comprises a positioning-device recipient 22 at the side opposite to the second connecting surface 21 to receive the positioning device 30. The second connecting surface 21 has an opening to communicate with the positioning-device recipient 22. Also, the second connecting surface 21 is provided with a semi-circular groove 23 and two limiting tabs 24 disposed at two ends of the groove 23 respectively. Furthermore, two springs 25 are disposed within the groove 23. When the seat supporting base 20 is pivotally connected with the pivot base 10, each of the springs 25 are disposed between the limiting tab 24 and the protruding piece 14.

Figure 5:
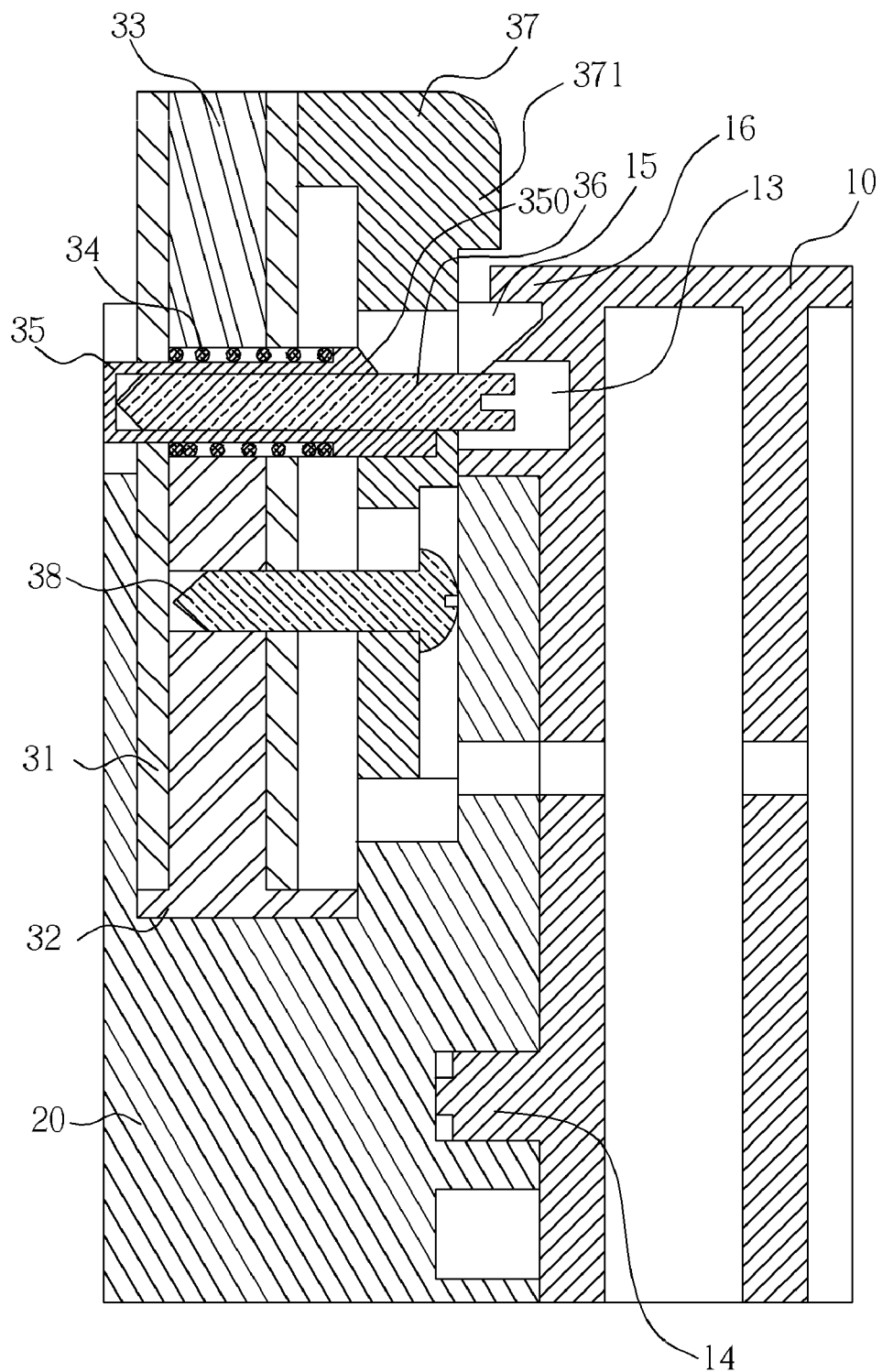
FIG. 5 is a cross-sectional assembly view showing the seat assembly mechanism at the right side of the stroller while the seat frame is assembled with the main frame.
Figure 5A:
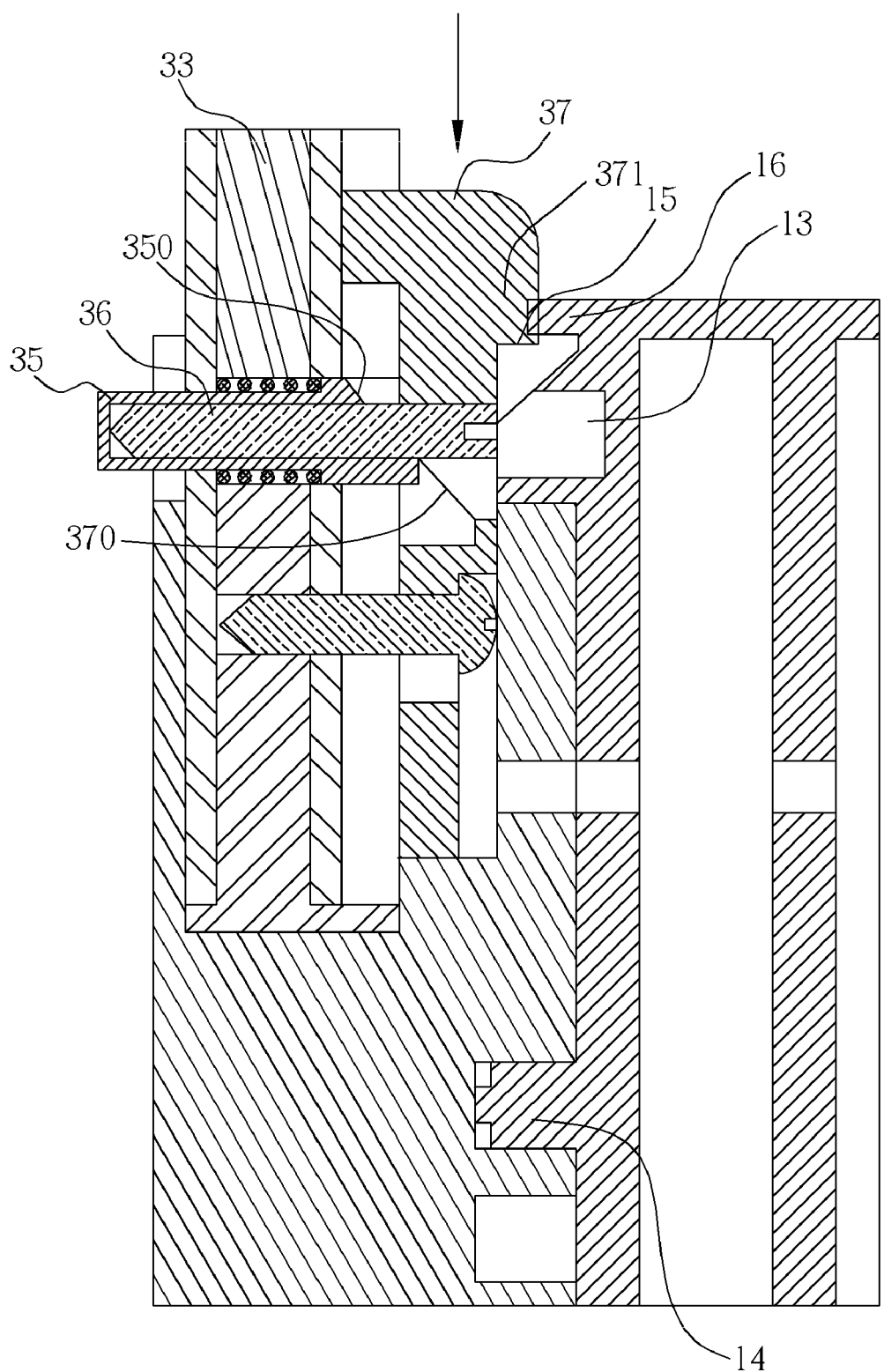
FIG. 5A is a cross-sectional assembly view showing the seat assembly mechanism at the right side of the stroller where a button is pressed downward, a first positioning rod is driven out of a positioning groove, and a blocking section is blocked by a blocker.
Figure 9:
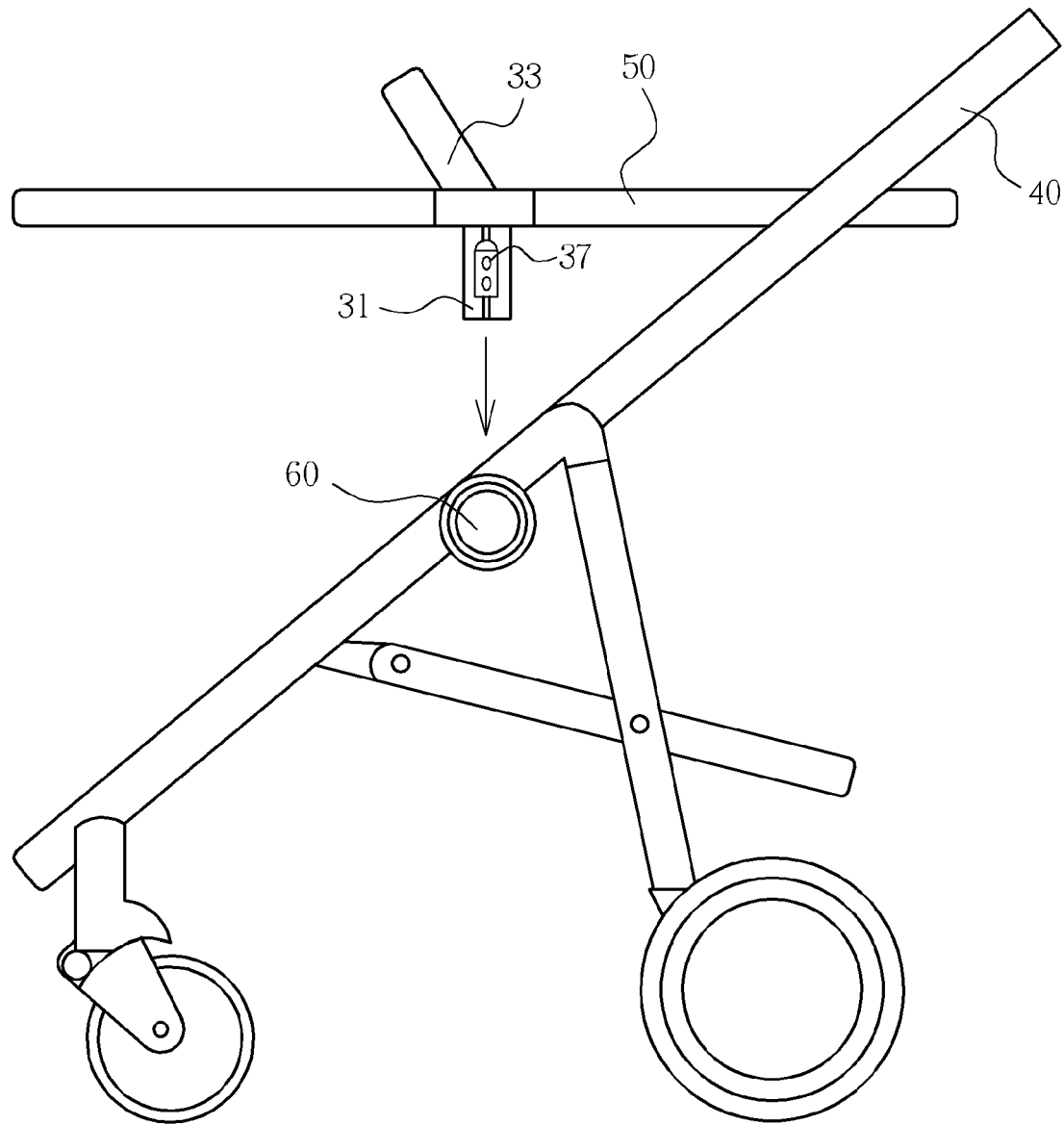
FIG. 9 is a schematic view showing the seat frame is held in a horizontal state and vertically inserted into the seat supporting base of the seat assembly mechanism for a stroller according to the present invention.

With reference to FIGS. 3, 5, and 9, as the seat frame 50 is horizontally held and vertically assembled with the main frame 40, the positioning devices 30 are inserted into the positioning-device recipients 22 of the seat supporting bases 20 respectively. The first positioning rod 36 is guided into the middle positioning groove 13 by the inclined opening 15. During this process, the first positioning rod 36 is pushed toward the second mounting portion 314 and the spring 34 is compressed. When the first positioning rod 36 arrives at the positioning groove 13, the spring 34 will return to its original state. At the same time, the spring 34 moves the positioning sleeve 35 away from the second mounting portion 314 and the front end of the first positioning rod 36 passing through the first positioning hole 372 is inserted into the middle groove 13. Then, the spring 34 returns to its original state. Thus, the pivot base 10 and the seat supporting base 20 are secured together and are unable to rotate relative to each other. As the button 37 is pressed downward, the first inclined face 370 pushes the second inclined face 350 so as to drive the first positioning rod 36 to disengage from the middle positioning groove 13 and the spring 34 is compressed (as shown in FIG. 5A). At this moment, the seat supporting base 20 can be rotated relative to the pivot base 10. When the seat supporting base 20 is rotated to an angle corresponding to another positioning groove 13, the button 37 is released and the compressed spring 34 returns to its original state. The positioning sleeve 35 is moved by the spring 34 and the first positioning rod 36 is inserted into another positioning groove 13. Therefore, the seat supporting base 20 is fixed to the pivot base 10 again and can not rotate relative to the pivot base 10.

Figure 6:
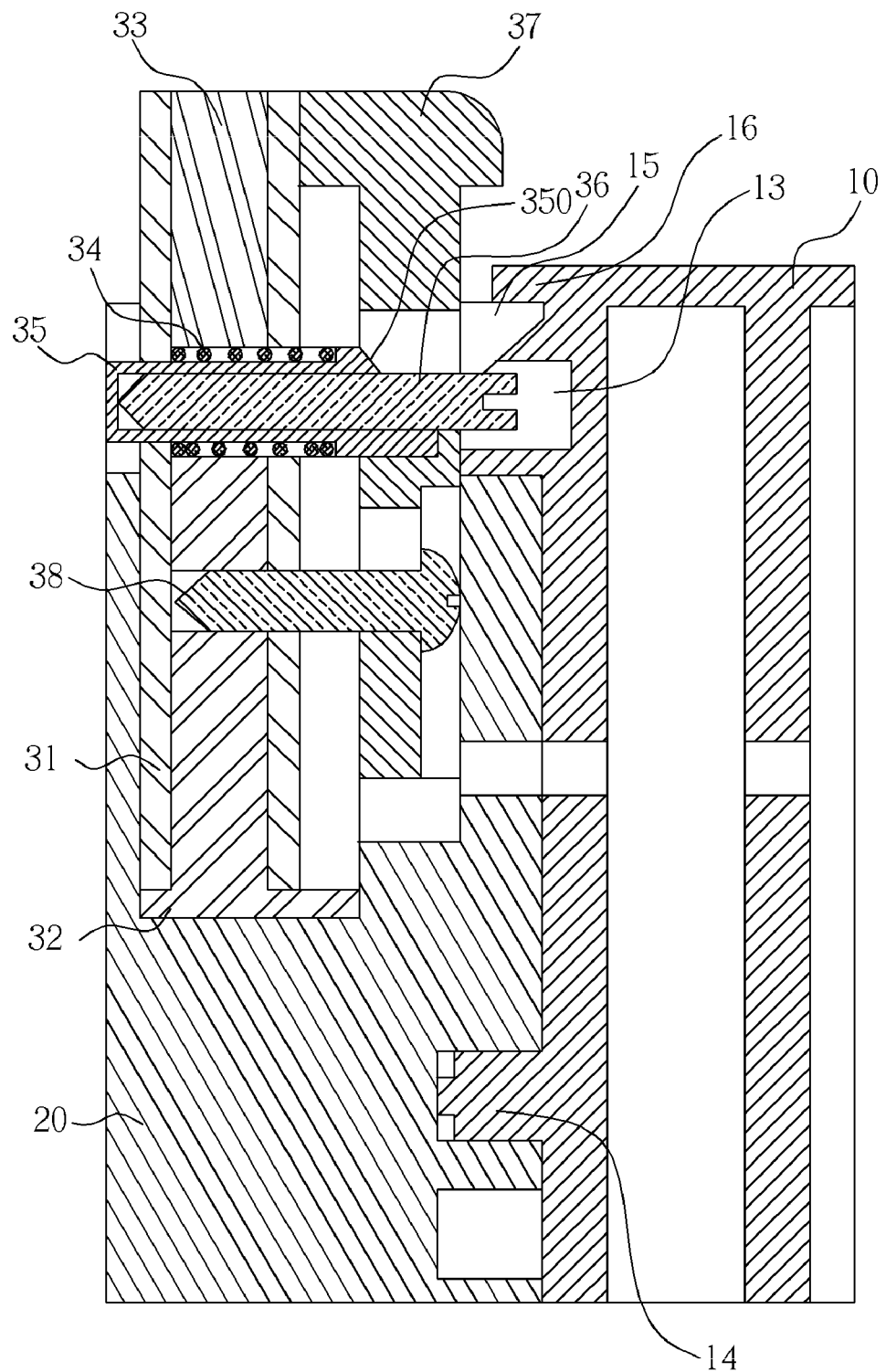
FIG. 6 is a cross-sectional assembly view showing the seat assembly mechanism at the left side of the stroller while the seat frame is assembled with the main frame.
Figure 6A:
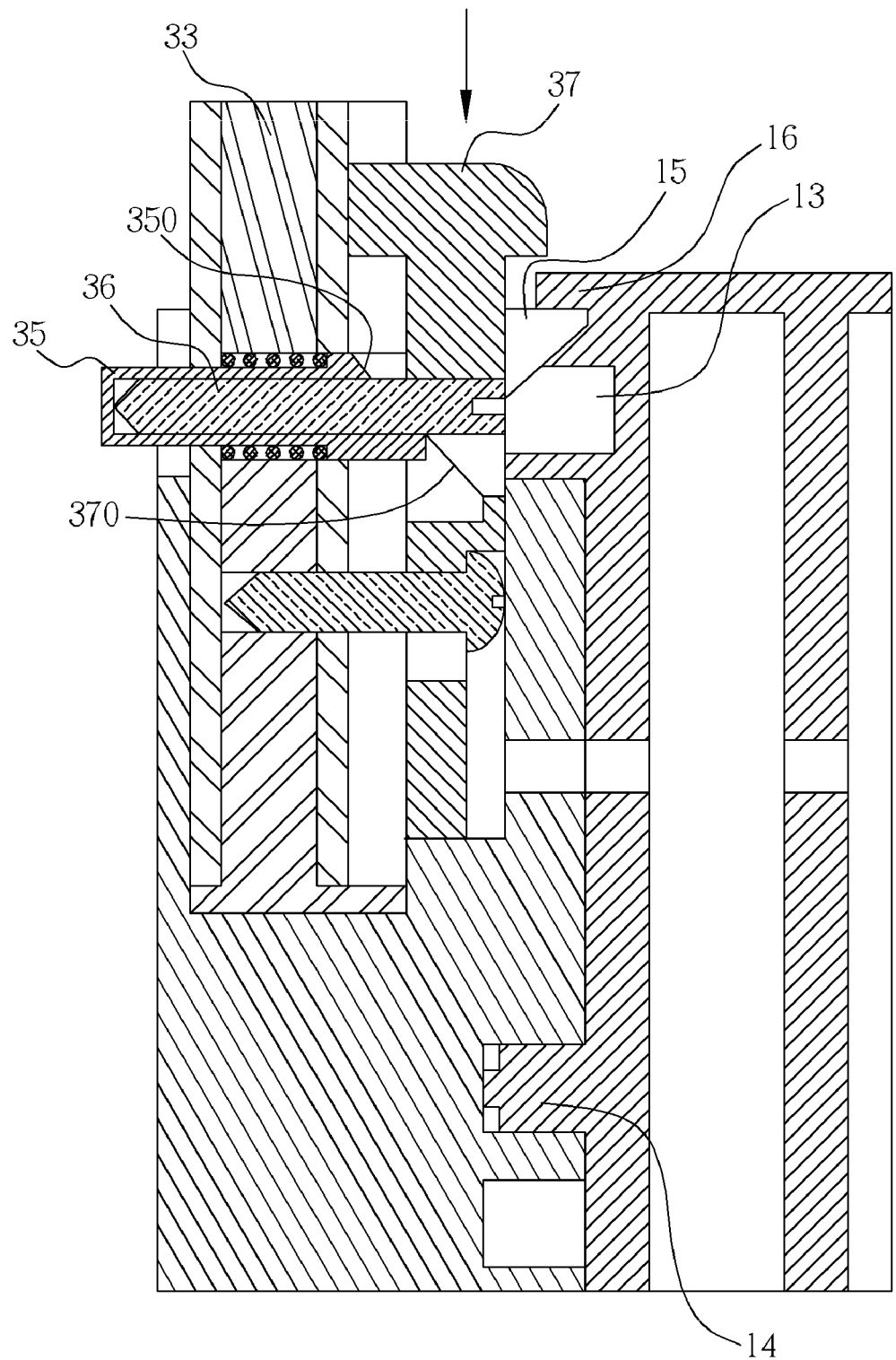
FIG. 6A is a cross-sectional assembly view showing the seat assembly mechanism at the left side of the stroller where a button is pressed downward, a first positioning rod is driven out of a positioning groove, and a blocking section is not blocked by a blocker.
Figure 7A:
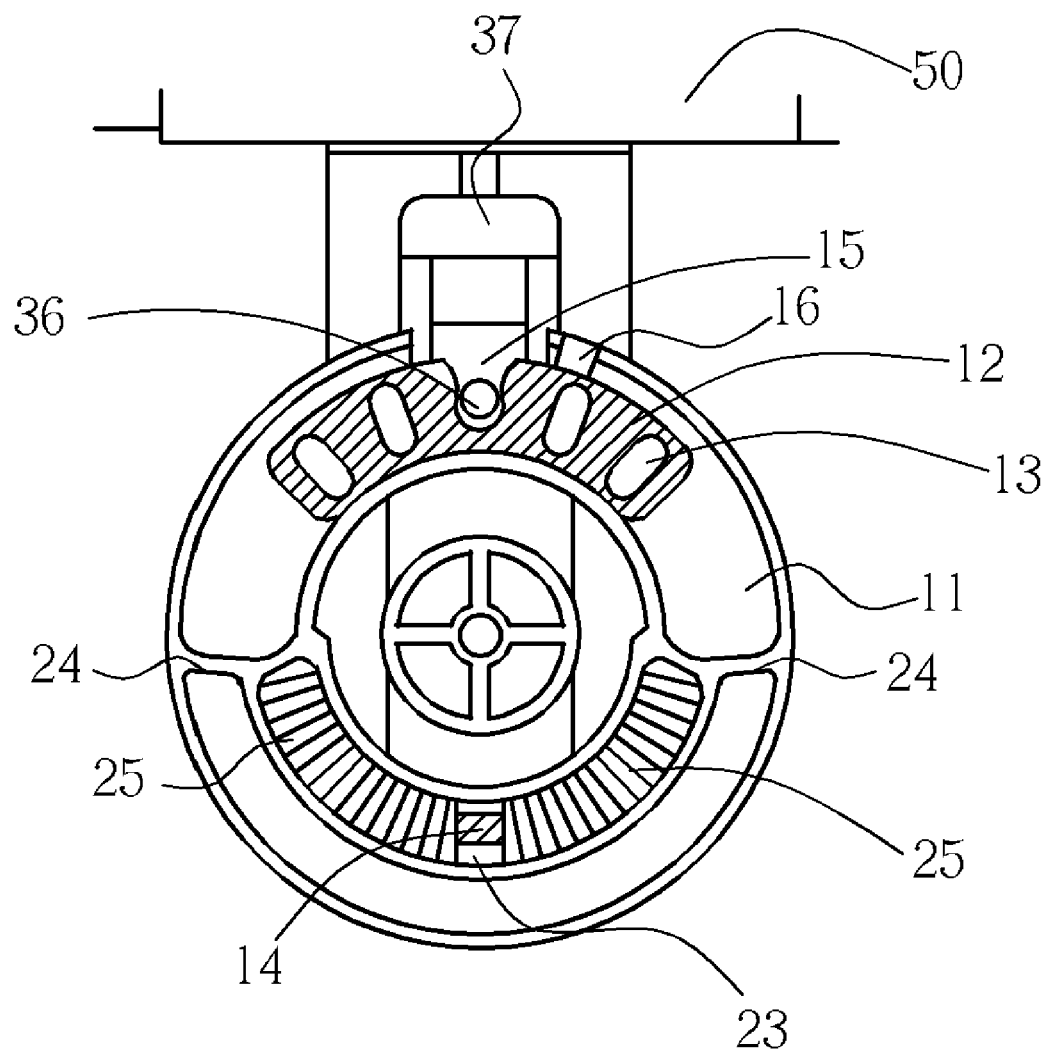
FIG. 7A is a schematic view showing the seat assembly mechanism at the right side of the stroller, as the seat frame of the stroller is in a horizontal state.

The seat assembly mechanism 60 for the stroller 2 according to the present invention can install the seat frame 50 facing forward or backward to the main frame 40. No matter the seat frame is facing forward or backward, the seat assembly mechanism 60 can prevent the seat frame 50 from being rotated to an angle to make the baby's head be lower than its feet. With reference to FIGS. 5, 5A, and 7A, the seat frame 50 is facing the front of the stroller 2. When the button 37 at the right side of the stroller 2 is pressed downward, the blocking section 371 is blocked by the blocker 16. Thus, the button 37 at the right side of the stroller 2 only allows the seat frame 50 to rotate forward but not backward. The baby will stay in the seat frame 50 with its head higher than its feet. However, because the button 37 at the left side is not provided with any blocking section 371 (with reference to FIGS. 6, and 6A), the button 37 at the left side of the stroller 2 allows the seat frame 50 to rotate forward and backward (with reference to FIG. 7B). Therefore, based on the difference between the button 37 of both sides of the seat assembly mechanisms 60, the seat frame 50 facing the front of the stroller 2 can only be rotated forward. As the seat frame 50 is rotated to a predetermined angle, the side edge of the protruding portion 12 is blocked by the limiting tab 24 (with reference to FIG. 7C), thereby preventing the seat frame 50 from over-rotation. As the seat frame 50 is positioned toward the back of the stroller 2, the seat assembly mechanism 60 functions in a similar way. When the button 37 at the right side of the seat frame 50 is pressed, the blocking section 371 is also restricted by the blocker 16 at the pivot base 10 at the left side of the main frame 40, thereby preventing the seat frame 50 from being rotated toward the front of the stroller 2. Thus, the baby can stay in the seat frame 50 with its head higher than its feet. However, the seat frame 50 can be rotated toward the back of the stroller 2 for adjusting the angle. As the seat frame 50 is rotated to a predetermined angle, the side edge of the protruding portion 12 is blocked by the limiting tab 24, thereby preventing the seat frame 50 from over-rotation.

Figure 7B:
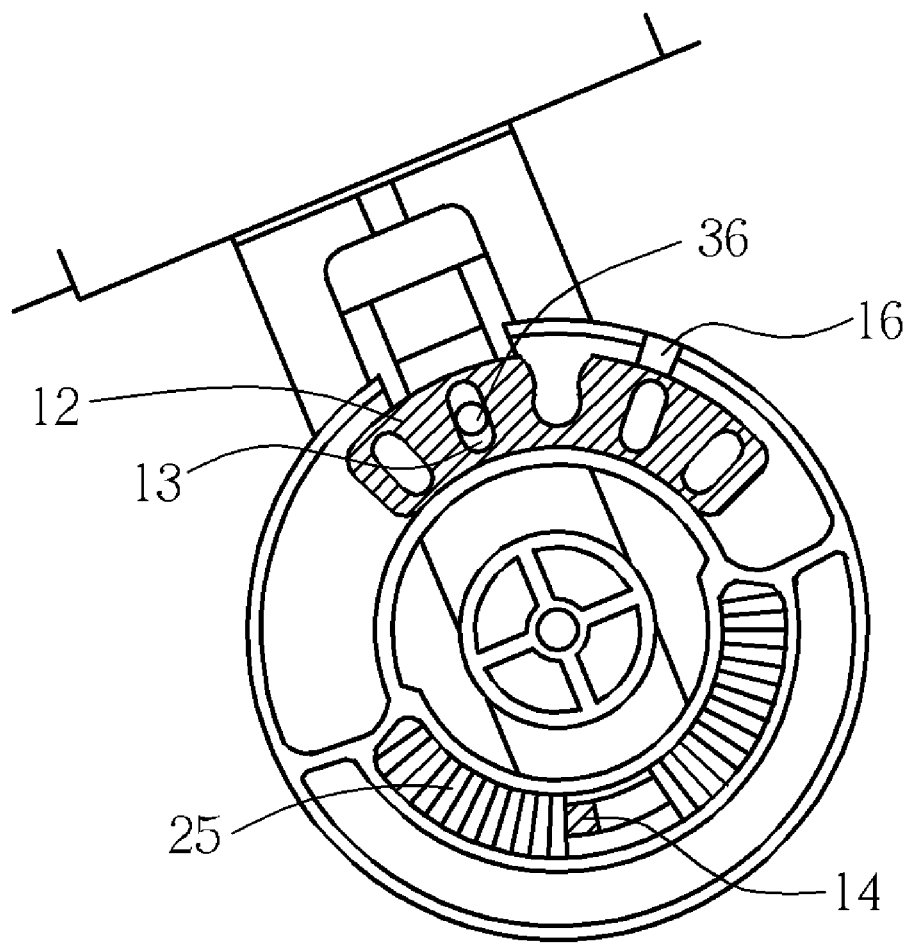
FIG. 7B is a schematic view showing the seat assembly mechanism at the right side of the stroller, as the seat frame of the stroller is in a first inclined position.
Figure 7C:
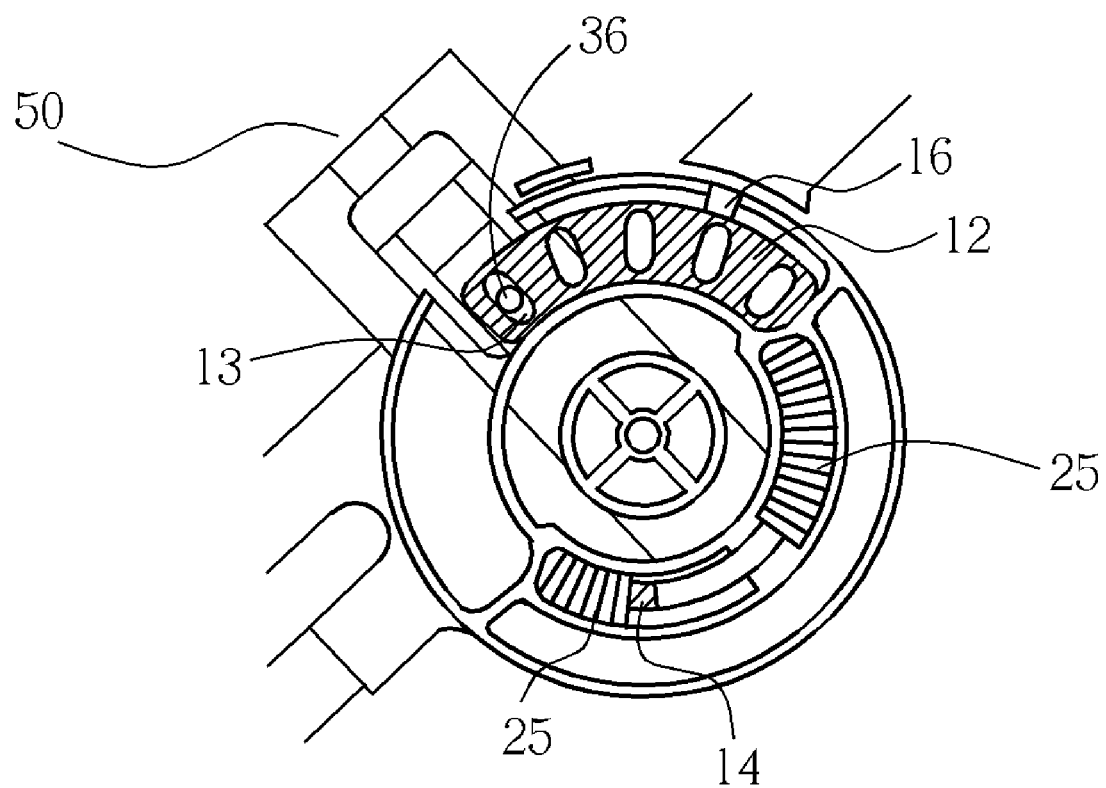
FIG. 7C is a schematic view showing the seat assembly mechanism at the right side of the stroller, as the seat frame of the stroller is in a second inclined position.

FIGS. 7A, 7B, and 7C are schematic views showing the relative position between the pivot base 10 and the groove 23, as the seat frame 50 is rotated forward in difference angles. With reference to FIG. 7A, the seat frame 50 is at a horizontal state. The first positioning rod 36 is inserted into the middle positioning groove 13. The protruding piece 14 divides the groove 23 into two parts, each of which is received with a spring 25. Both of the springs 25 are in the same compressed state.

With reference to FIG. 7B, the seat frame 50 is rotated to a first inclined position, and the first positioning rod 36 is inserted into a second positioning groove 13 that is positioned at the left side of the middle positioning groove 13 (the middle positioning groove 13 is the third one). The two springs 25 are compressed to different states. The left spring 25 is compressed to a length shorter than that of the right spring 25.

With reference to FIG. 7C, the seat frame 50 is rotated to a second inclined position, and the first positioning rod 36 is inserted into a first positioning groove 13 that is positioned at the left side of the second positioning groove 13. The two springs 25 are compressed to different states. The left spring 25 is compressed to a length shorter than that of the right spring 25. The left spring 25 in FIG. 7C is compressed to a length shorter than that of the left spring 25 in FIG. 7B.

As the seat frame 50 is adjusted to a different inclined angle, it only needs to insert the first positioning rod 36 into the corresponding positioning grooves 13. The adjusting process comprises pressing the button 37; the positioning sleeve 35 pressing the spring 34 and moving toward the interior of the second mounting portion 314; the first positioning rod 36 connected with the positioning sleeve 35 also moving toward the interior of the second mounting portion 314; the end of the first positioning rod 36 disengaging from the positioning groove 13, so that the seat frame 50 can be rotated freely; rotating the seat frame 50 to a proper inclined position; releasing the button 37; the spring 34 returning to its original state and pushing the positioning sleeve 35 away from the second mounting portion 314; the first positioning rod 36 connected with the positioning sleeve 35 also moving away from the second mounting portion 314 and being inserted into the corresponding positioning groove 13. Thus, the inclined angle of the seat frame 50 is adjusted.

Figure 8A:
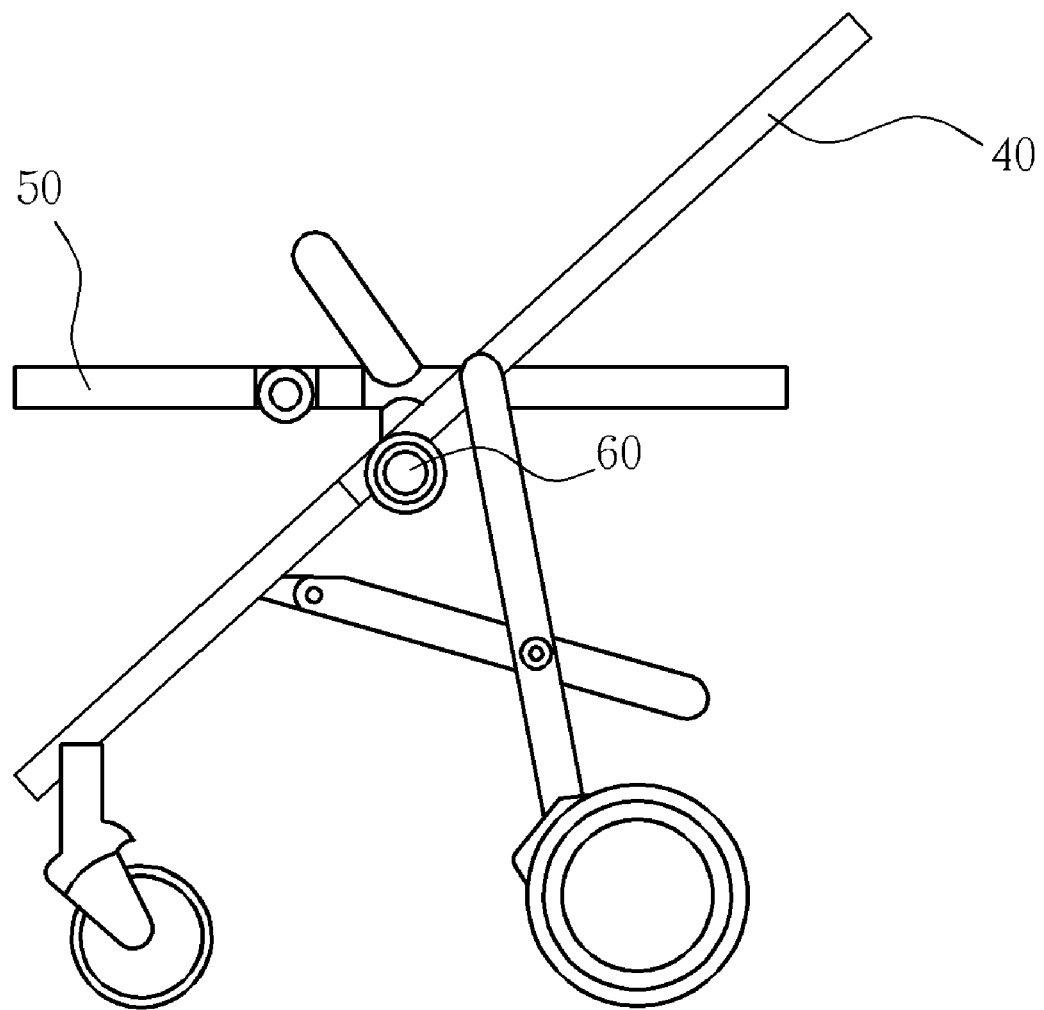
FIG. 8A is a schematic view showing a stroller having the seat assembly mechanisms according to the present invention, as the seat frame is facing the front of the stroller and in a horizontal state.
Figure 8B:
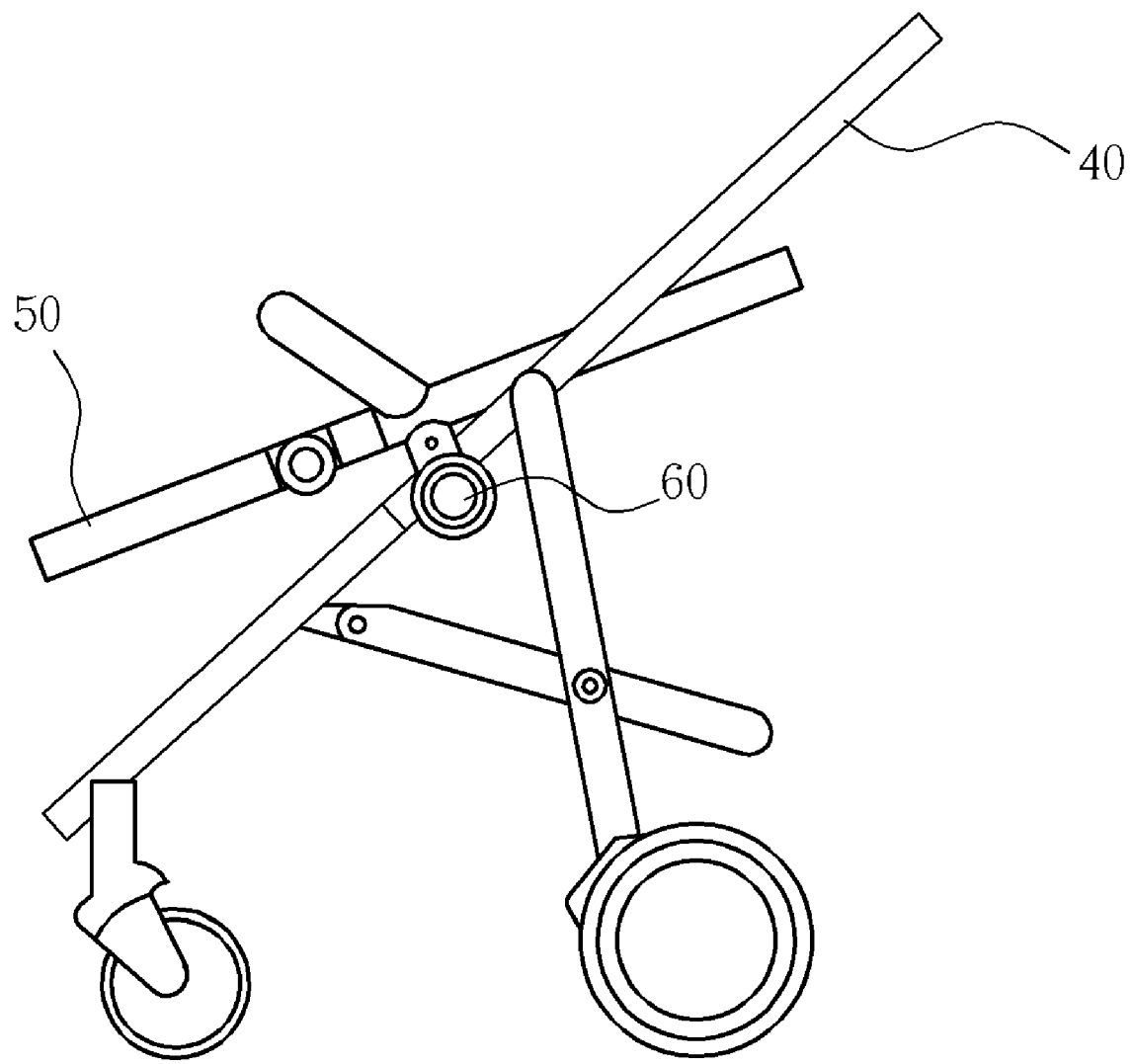
FIG. 8B is a schematic view showing a stroller having the seat assembly mechanisms according to the present invention, as the seat frame is facing the front of the stroller and in the first inclined position.
Figure 8C:
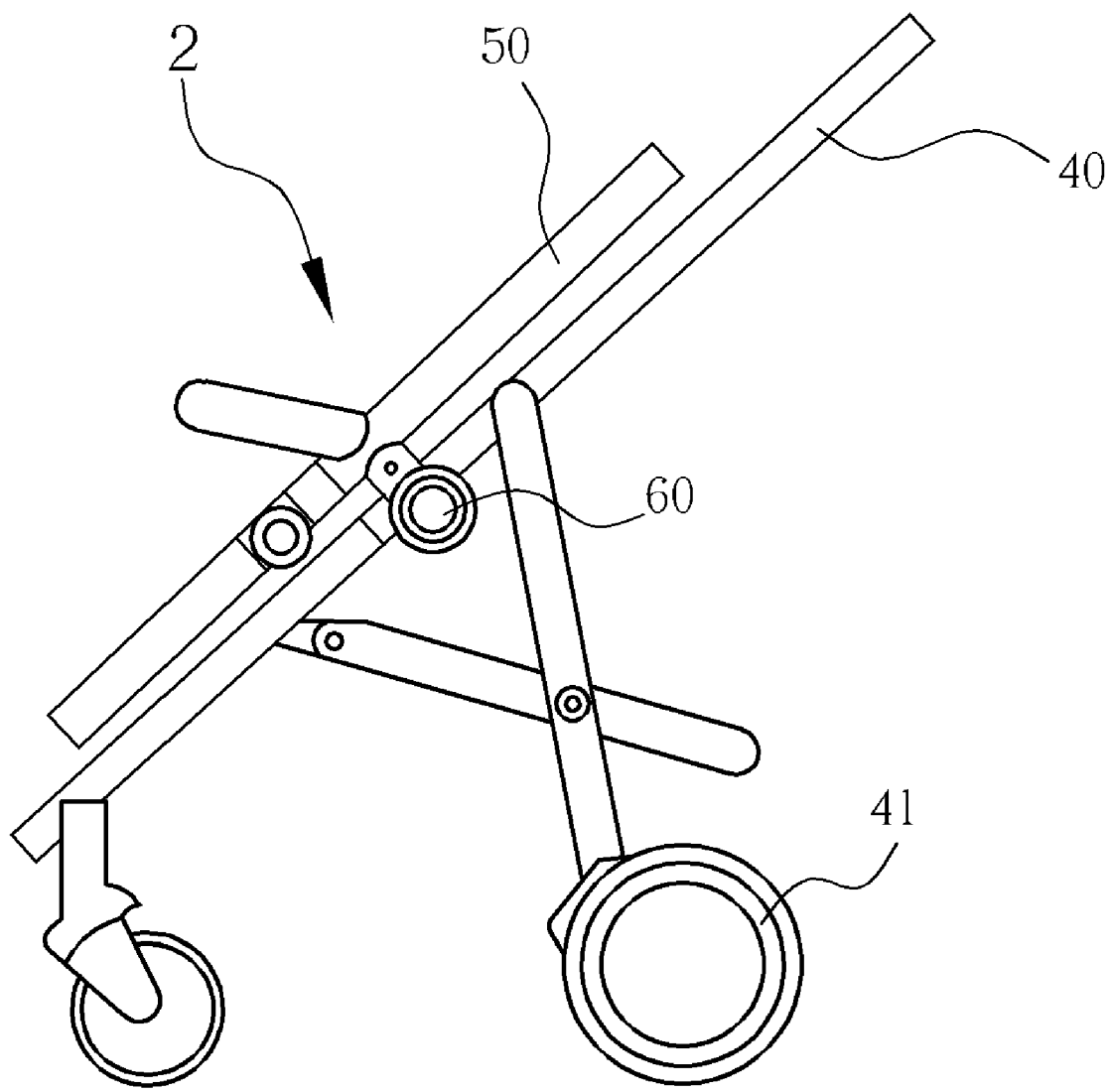
FIG. 8C is a schematic view showing a stroller having the seat assembly mechanisms according to the present invention, as the seat frame is facing the front of the stroller and in the second inclined position.
Figure 8D:
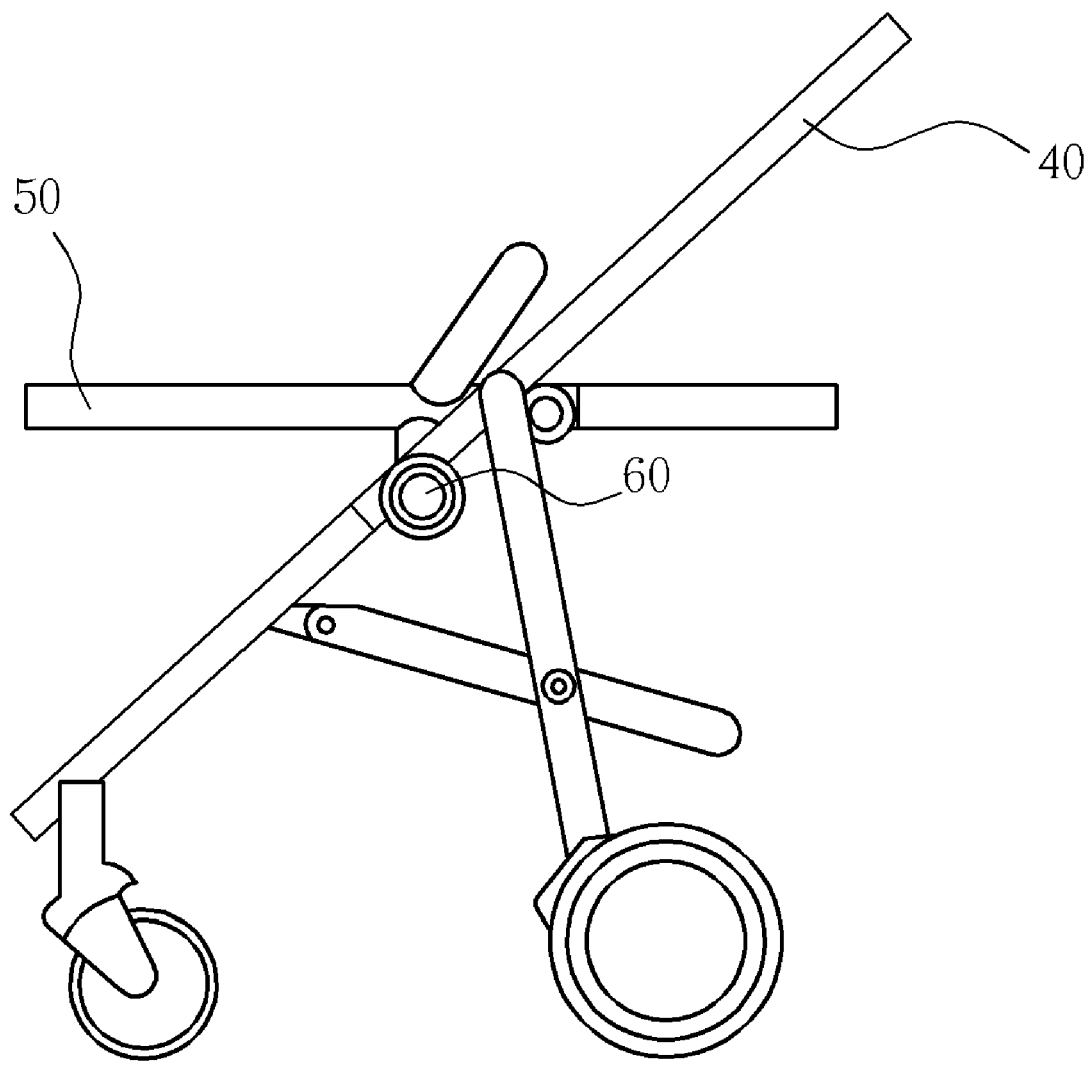
FIG. 8D is a schematic view showing a stroller having the seat assembly mechanisms according to the present invention, as the seat frame is facing the rear of the stroller and in a horizontal state.
Figure 8E:
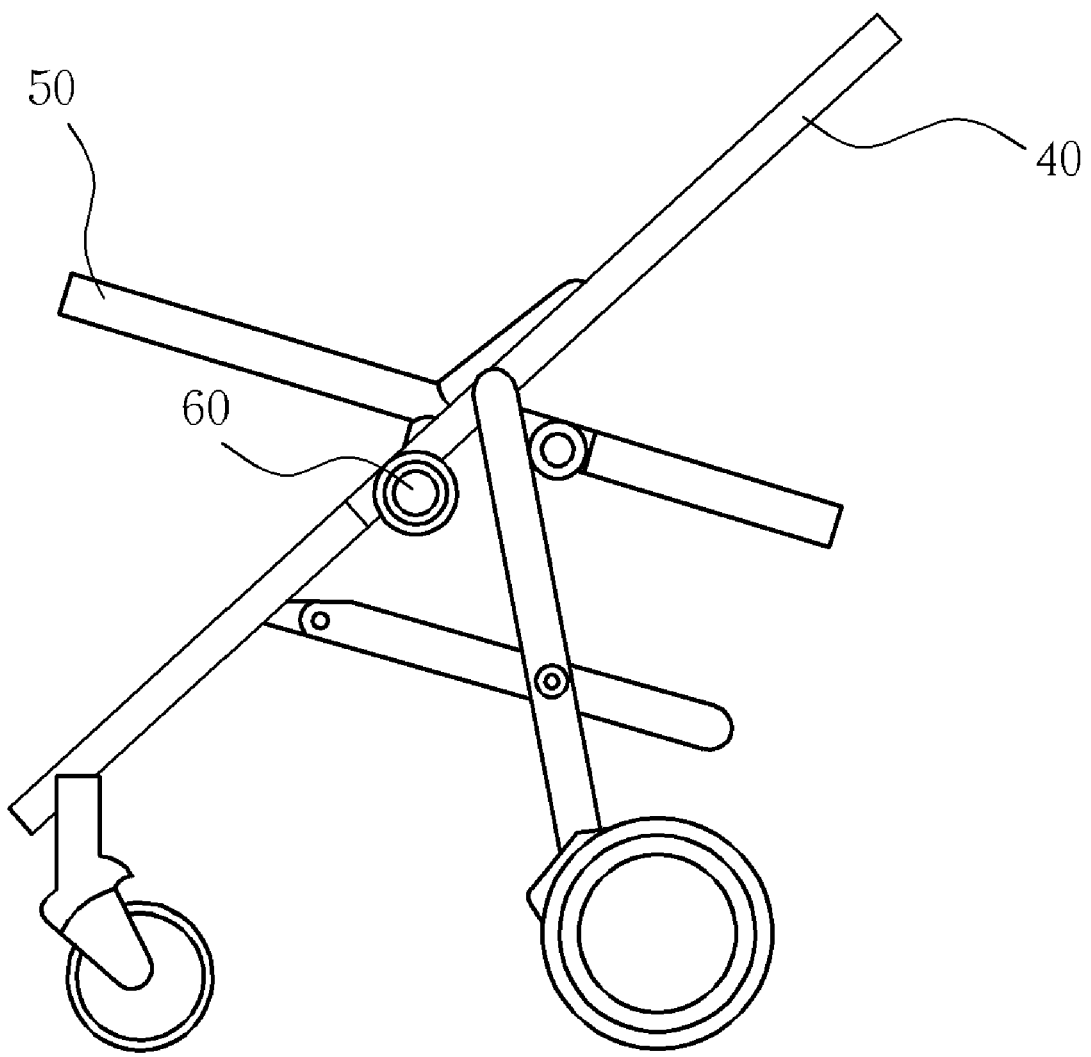
FIG. 8E is a schematic view showing a stroller having the seat assembly mechanisms according to the present invention, as the seat frame is facing the rear of the stroller and in the first inclined position.
Figure 8F:
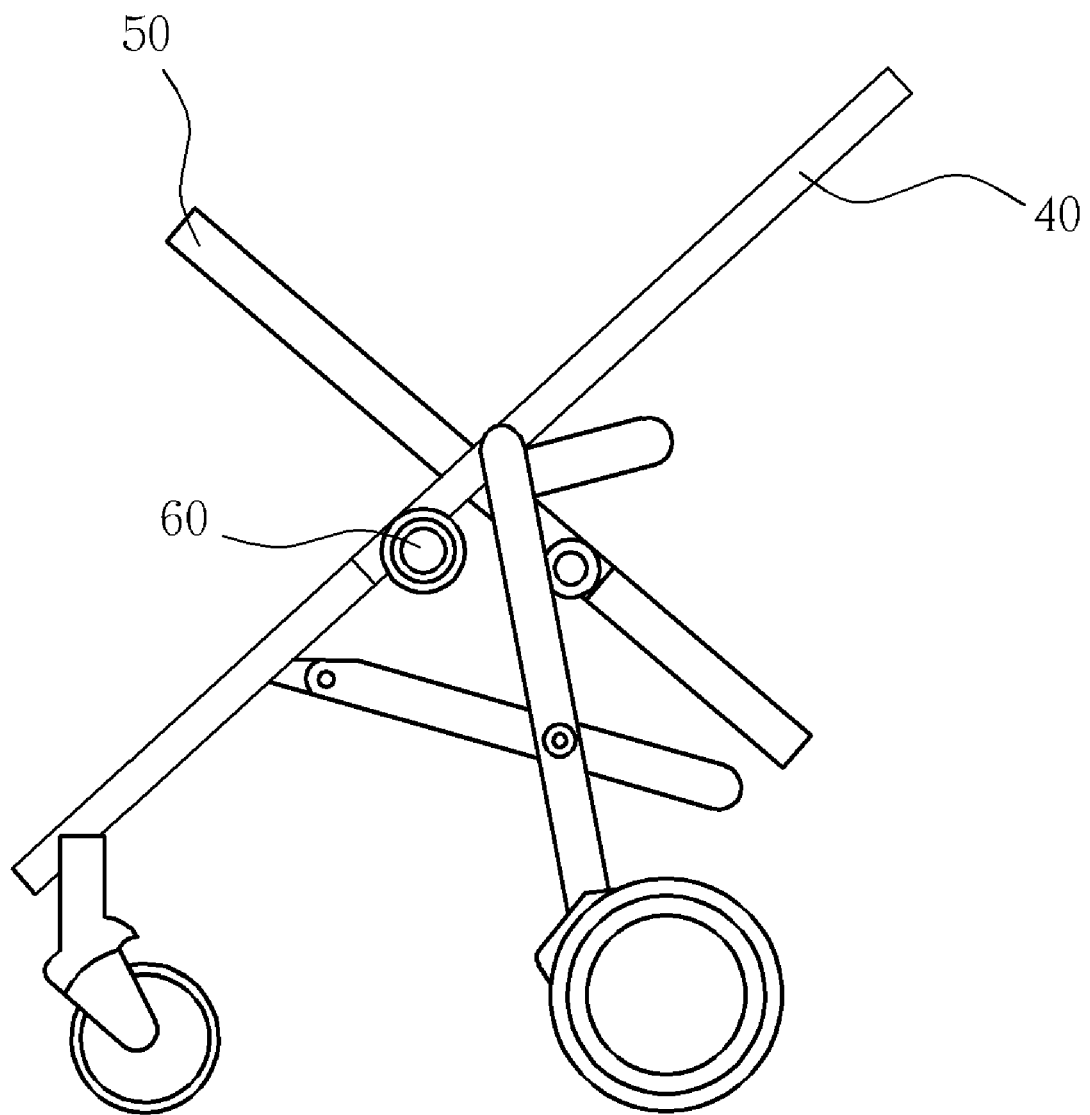
FIG. 8F is a schematic view showing a stroller having the seat assembly mechanisms according to the present invention, as the seat frame is facing the rear of the stroller and in the second inclined position.

With reference to FIGS. 8A, 8B, and 8C, the seat frame 50 is facing the front of the stroller 2 and is in the horizontal state, the first inclined position and the second inclined position, respectively. With reference to FIGS. 8D, 8E, and 8F, the seat frame 50 is facing the back of the stroller 2 and is in the horizontal state, the first inclined position and the second inclined position, respectively. As the seat frame 50 is rotated forward or backward to a biggest safety angle, the side edge of the protruding portion 12 is blocked by the limiting tab 24, thereby preventing the seat frame 50 from further rotation. The danger caused by the over-rotation can be prevented.

According to the present invention, no matter what inclined position the seat frame 50 is disposed in, the seat supporting base 20 always returns to the original horizontal state after the seat frame 50 is disassembled from the seat supporting base 20. Thus, the seat frame 50 can be vertically inserted downward into the seat supporting base 20, as the seat frame 50 is assembled with the main frame 40 again. In the assembly process mentioned above, as the seat frame 50 is disassembled from the seat supporting base 20, the first positioning rod 36 is disengaged from the positioning groove 13. In the mean time, two springs 25 return to their original states respectively, thereby returning the seat supporting base 20 to the original horizontal state. Therefore, the seat frame 50 can be vertically inserted downward into the seat supporting base 20 again.

Figure 10:
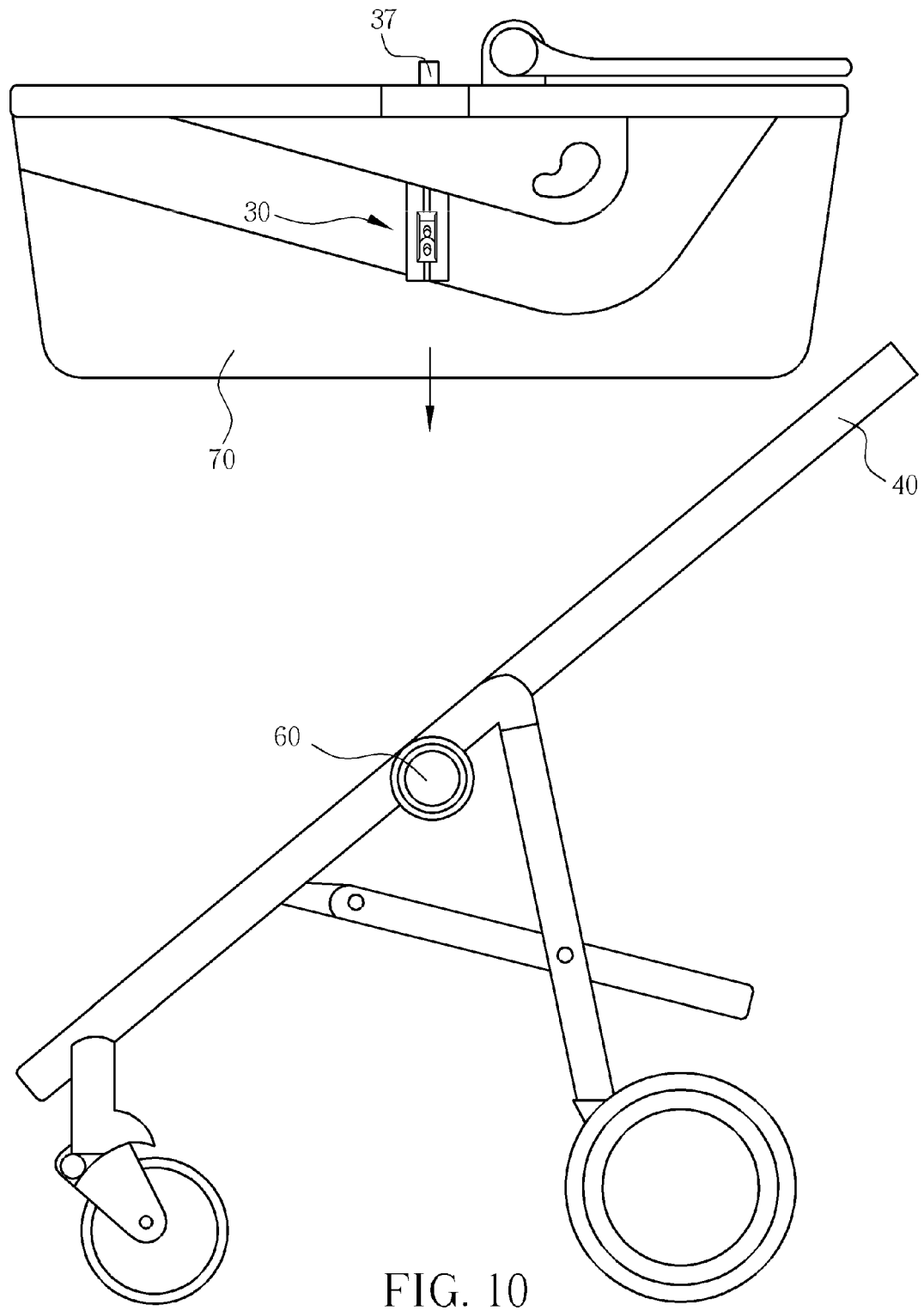
FIG. 10 is a schematic view showing an infant carrier having the seat assembly mechanisms according to another embodiment of the present invention, in which the positioning device is on the infant carrier for being connected with the seat supporting base and the pivot base.

The seat assembly mechanism according to the present invention not only can be used on an infant seat, but also can be used on an infant carrier 70 (as shown in FIG. 10) or a car seat. The left and right sides of the infant carrier 70 are respectively provided with a positioning device 30. The upper operation portion of a button 37 protrudes from the top of the infant carrier 70 for convenience. In the same way, the buttons 37 at the right side and the left side are slightly different in structure, thereby preventing the baby sleeping in the infant carrier 70 with its head lower than its feet.

Figure 11:
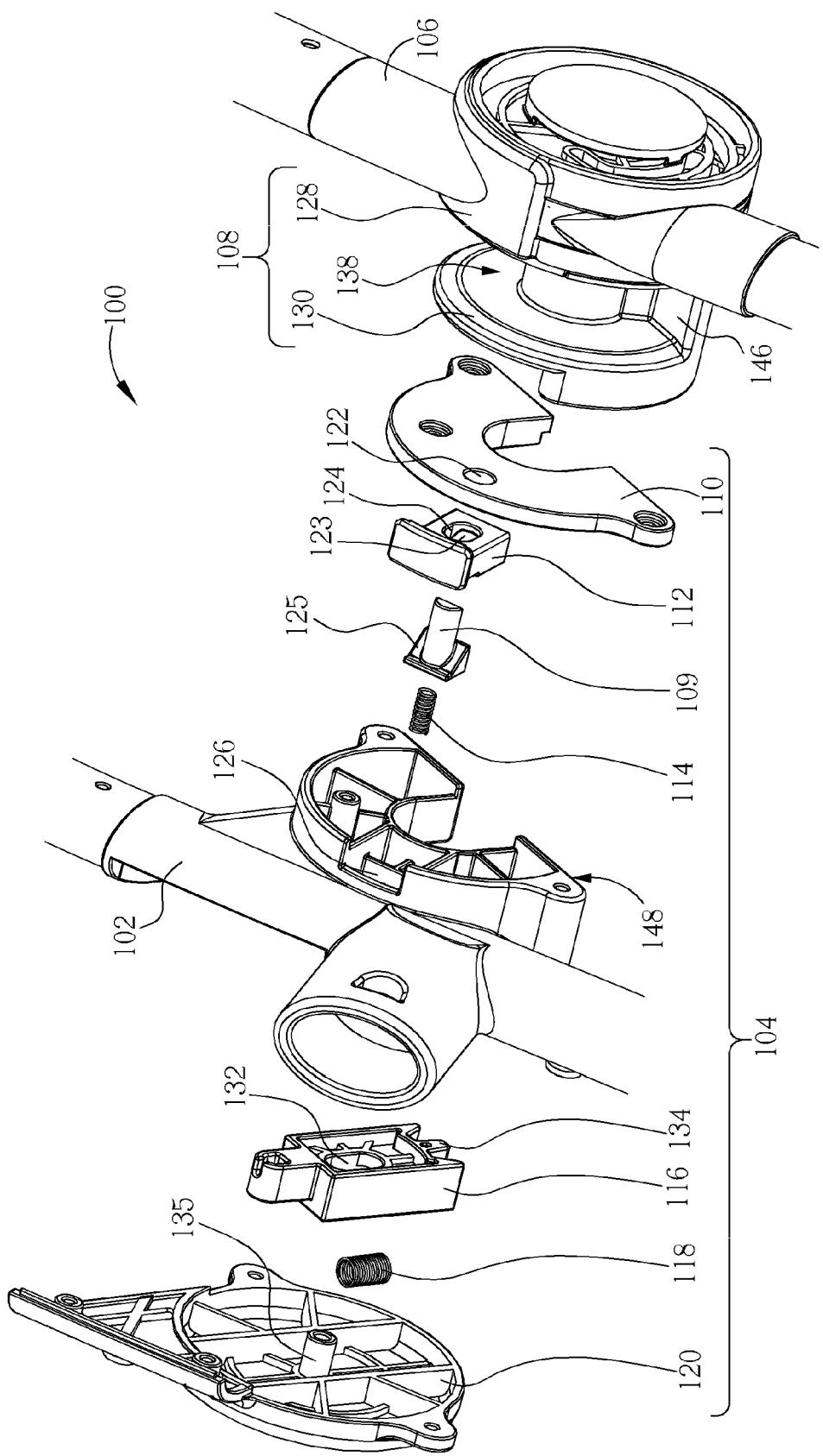
FIG. 11 is an exploded view showing a seat assembly mechanism according to another embodiment of the present invention.
Figure 12:
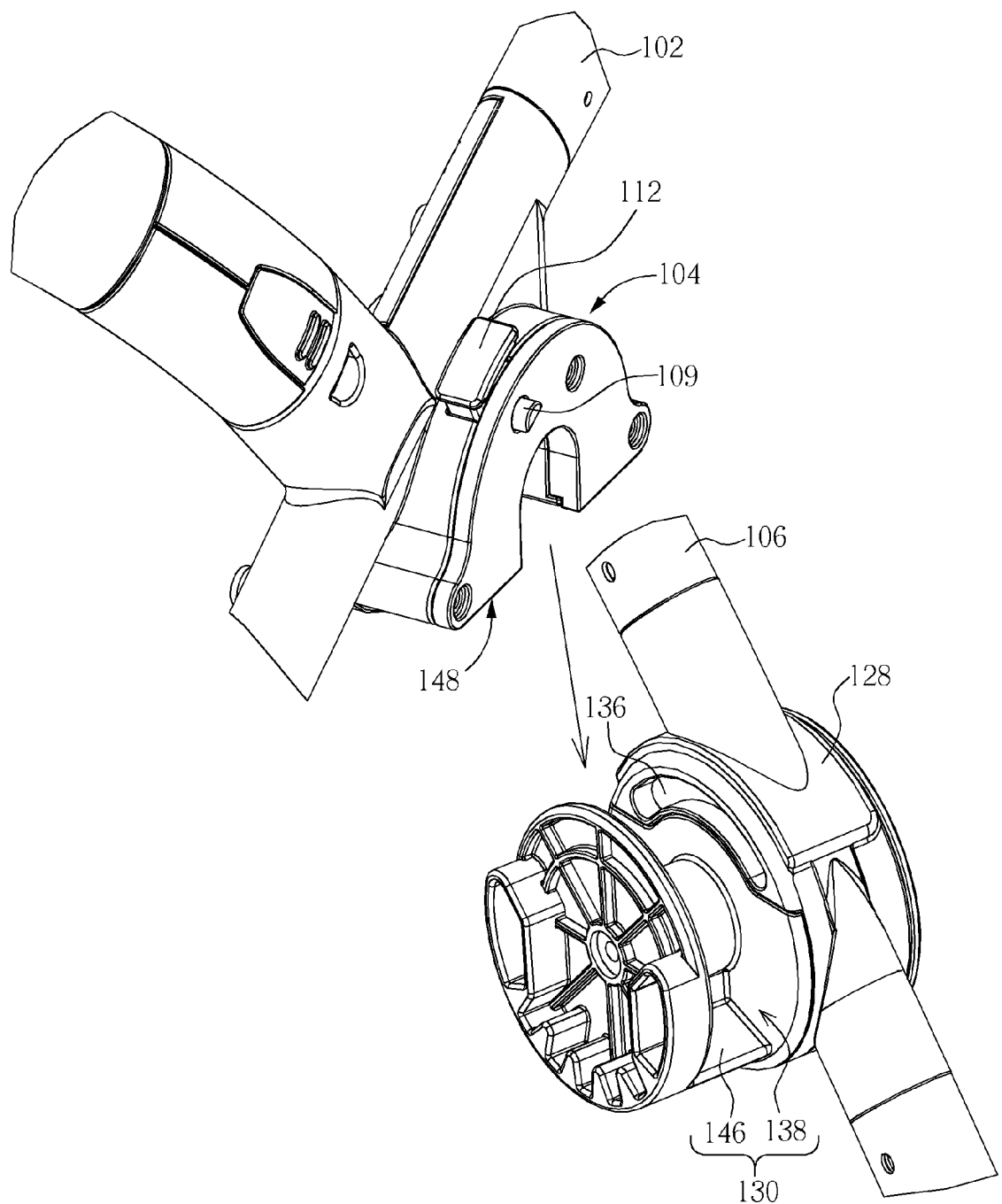
FIG. 12 is an assembly view showing the positioning device and the seat supporting member in FIG. 11.

Next, please refer to FIG. 11. FIG. 11 is an exploded diagram of a seat assembly mechanism 100 according to another embodiment of the present invention. The seat assembly mechanisms 100 are disposed at the left and right sides of the stroller 2 respectively. In the following, more detailed description for the seat assembly mechanism 100 disposed at the right side of the stroller 2 is provided. As for the seat assembly mechanism 100 disposed at the left side of the stroller 2, its structure is the same as that disposed at the right side of the stroller 2, and therefore its related description is omitted herein. The seat assembly mechanism 100 comprises a positioning device 104 disposed on a seat frame 102 and a seat supporting member 108 disposed on a main frame 106. The positioning device 104 is detachably mounted on the seat supporting member 108 so as to assemble the seat frame 102 to the main frame 106 detachably. The positioning device 104 comprises a positioning pin 109, an outer cover 110, a button 112, a first spring 114, a positioning slider 116, a second spring 118, and an inner cover 120. The outer cover 110 has a positioning hole 122, and the button 112 has a first guide slot 124 corresponding to the positioning hole 122. A first inclined face 123 is formed inside the first guide slot 124. An end of the positioning pin 109 is formed with a second inclined face 125. The other end of the positioning pin 109 passes through the first guide slot 124 and the positioning hole 122 in order and protrudes outside the positioning device 104 (as shown in FIG. 12). The first spring 114 is disposed in a groove 126 formed on one side of the seat frame 102, and the other end of the positioning pin 109 sheathes the first spring 114. The outer cover 110 is fixed on the seat frame 102 so as to assemble the button 112, the positioning pin 109, and the first spring 114 to the side of the seat frame 102. In this condition, the second inclined face 125 of the positioning pin 109 abuts against the first inclined face 123 in the first guide slot 124 by elastic force provided from the first spring 114. The positioning pin 109 is moved elastically between the first guide slot 124 and the positioning hole 122 by the first spring 114.

The positioning slider 116 has a second guide slot 132 and an engaging tooth 134. The inner cover 120 has a protruding shaft 135. The protruding shaft 135 is disposed through the second guide slot 132. The second spring 118 is disposed in the second guide slot 132 and abuts against the positioning slide 116 and the protruding shaft 135, so that the positioning slider 116 is movable relative to the seat frame 102 and the inner cover 120. It should be mentioned that the outer cover 110 assembles the positioning pin 109, the button 112, and the first spring 114 to the side of the seat frame 102 in a screw-locking manner. Furthermore, the inner cover 120 assembles the positioning slider 116 and the second spring 118 to the opposite side of the seat frame 102 in a screw-locking manner. In other words, the outer cover 110 is connected to the inner cover 120 in a screw-locking manner for assembling the positioning device 104 to the seat frame 102 (as shown in FIG. 12). The seat supporting member 108 comprises a pivot base 128 and a seat supporting base 130 connected to a side of the pivot base 128. The said side of the pivot base 128 is formed with a positioning-device recipient 138 for receiving the positioning device 104. In this embodiment, the positioning-device recipient 138 has two side walls. One of the two side walls is formed with a part of the pivot base 128, and the positioning groove 136 is located on the side wall.

Figure 13:
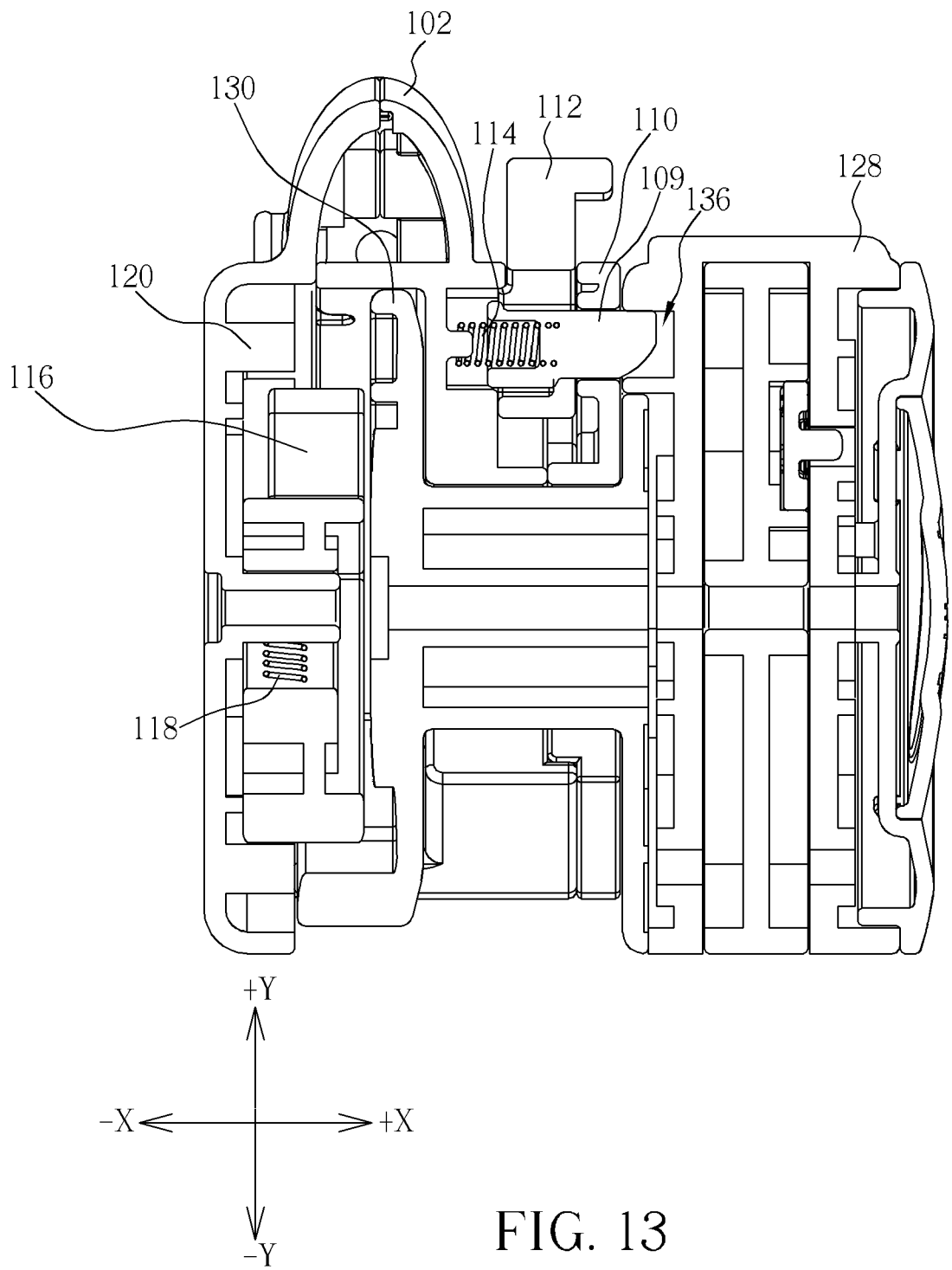
FIG. 13 is a cross-sectional view showing that the positioning pin inserts into the positioning groove when the seat frame is mounted on the main frame.
Figure 14:
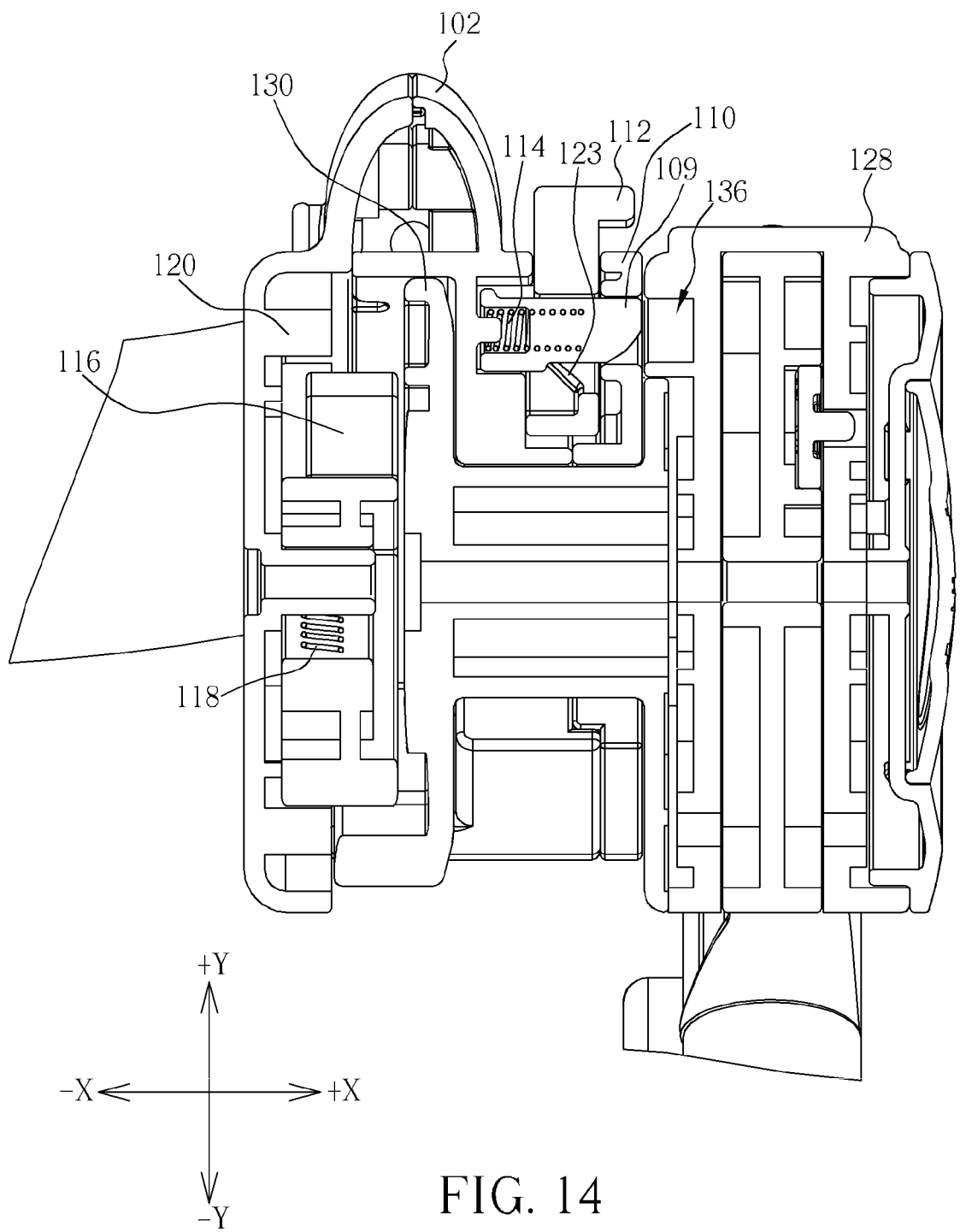
FIG. 14 is a cross-sectional view showing the positioning pin disengages from the positioning groove in FIG. 13.

In the following, more detailed description for the positioning device 104 is provided. Please refer to FIGS. 11, 12, and 13. FIG. 12 is an assembly view showing the positioning device 104 and the seat supporting member 108 in FIG. 11. FIG. 13 is a cross-sectional view showing the positioning pin 109 inserting into the positioning groove 136 when the seat frame 102 is mounted on the main frame 106. When the positioning device 104 is assembled with the positioning-device recipient 138 along an arrow shown in FIG. 12, the positioning pin 109 protruding outside the positioning device 104 is pushed by the side wall of the pivot base 128, and then is moved back into the positioning hole 122 along -X-axis shown in FIG. 13 (at this moment, the first spring 114 is in a compressed state). Subsequently, when the positioning hole 122 is aligned to the positioning groove 136, the positioning pin 109 is inserted into the positioning groove 136 again by elastic force provided from the first spring 114 (as shown in FIG. 13). As a result, the seat frame 102 is mounted on the main frame 106 by the seat assembly mechanisms 100 respectively disposed at the right and left sides of the stroller 2. On the contrary, if a user wants to disassemble the positioning device 104 from the positioning-device recipient 138, the user just needs to exert force on the button 112 along -Y-axis. In the mean time, the first inclined face 123 of the button 112 is moved along -Y-axis correspondingly and pushes the second inclined face 125 of the positioning pin 109 to move along -X-axis, and then the positioning pin 109 is moved back into the positioning hole 122 along -X-axis again. Subsequently, when the positioning pin 109 completely disengages from the positioning groove 136 (as shown in FIG. 14), the positioning device 104 of the seat frame 102 may disengage from the positioning-device recipient 138 of the seat supporting base 130. The assembly process of the seat assembly mechanism 100 disposed at the left side of the stroller 2 is the same as mentioned above, and therefore the seat frame 102 may be disassembled from the main frame 106 through the seat assembly mechanisms 100 disposed at the right and left sides of the stroller 2 respectively.

Figure 15:
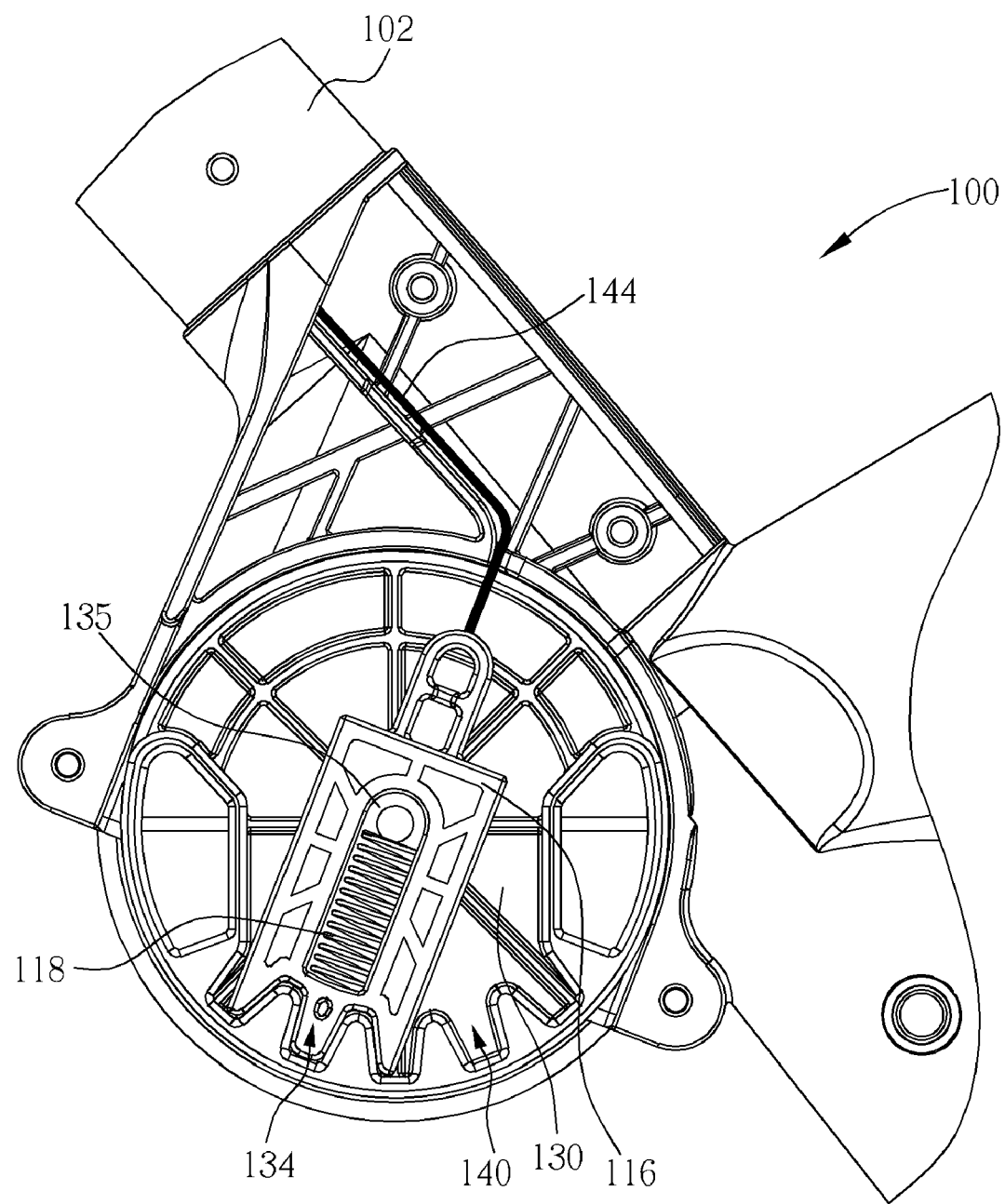
FIG. 15 is a side view showing the seat assembly mechanism in FIG. 11.
Figure 16:
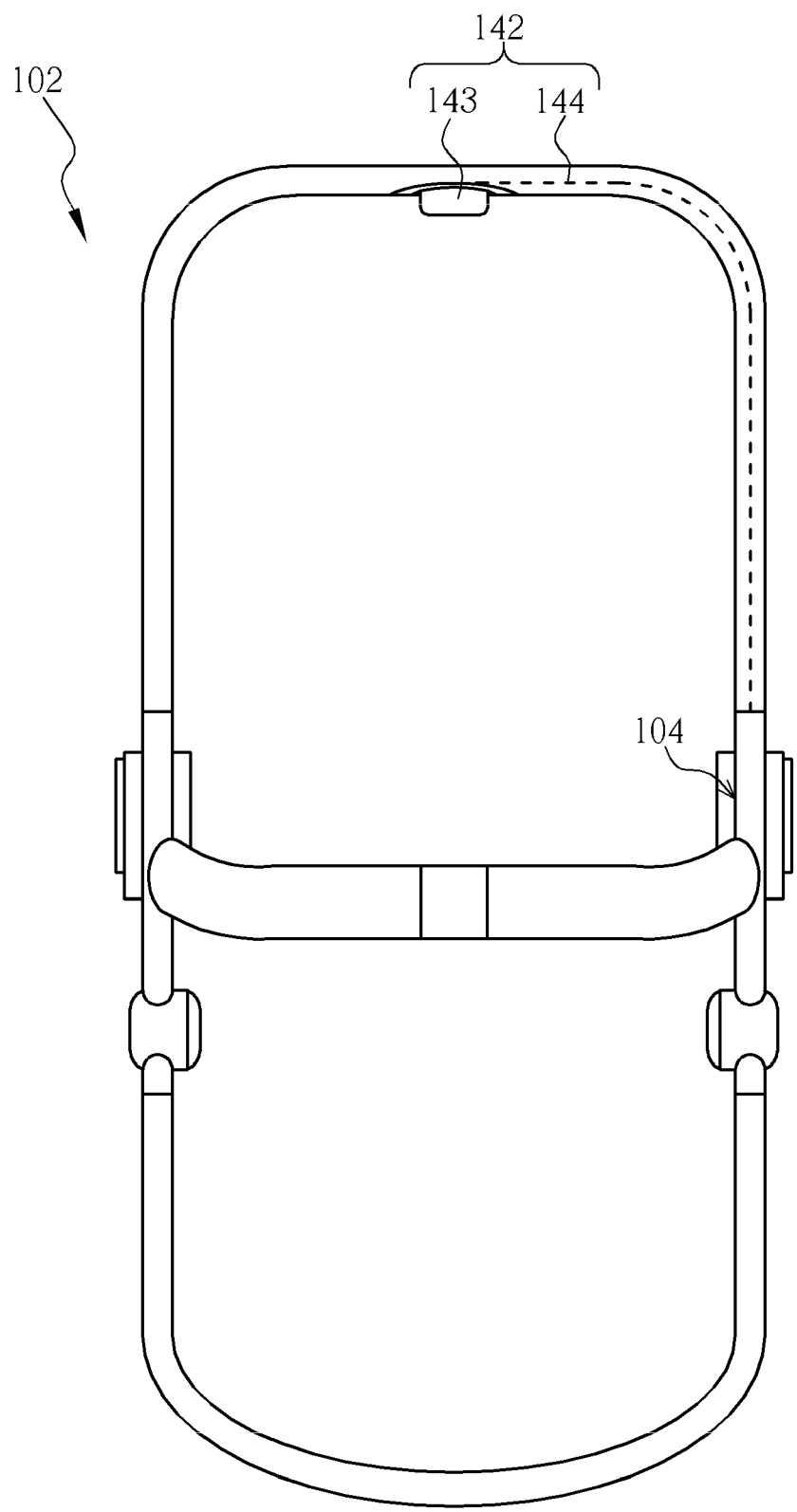
FIG. 16 is a schematic view showing the seat assembly mechanism in FIG. 11.
Figure 17:
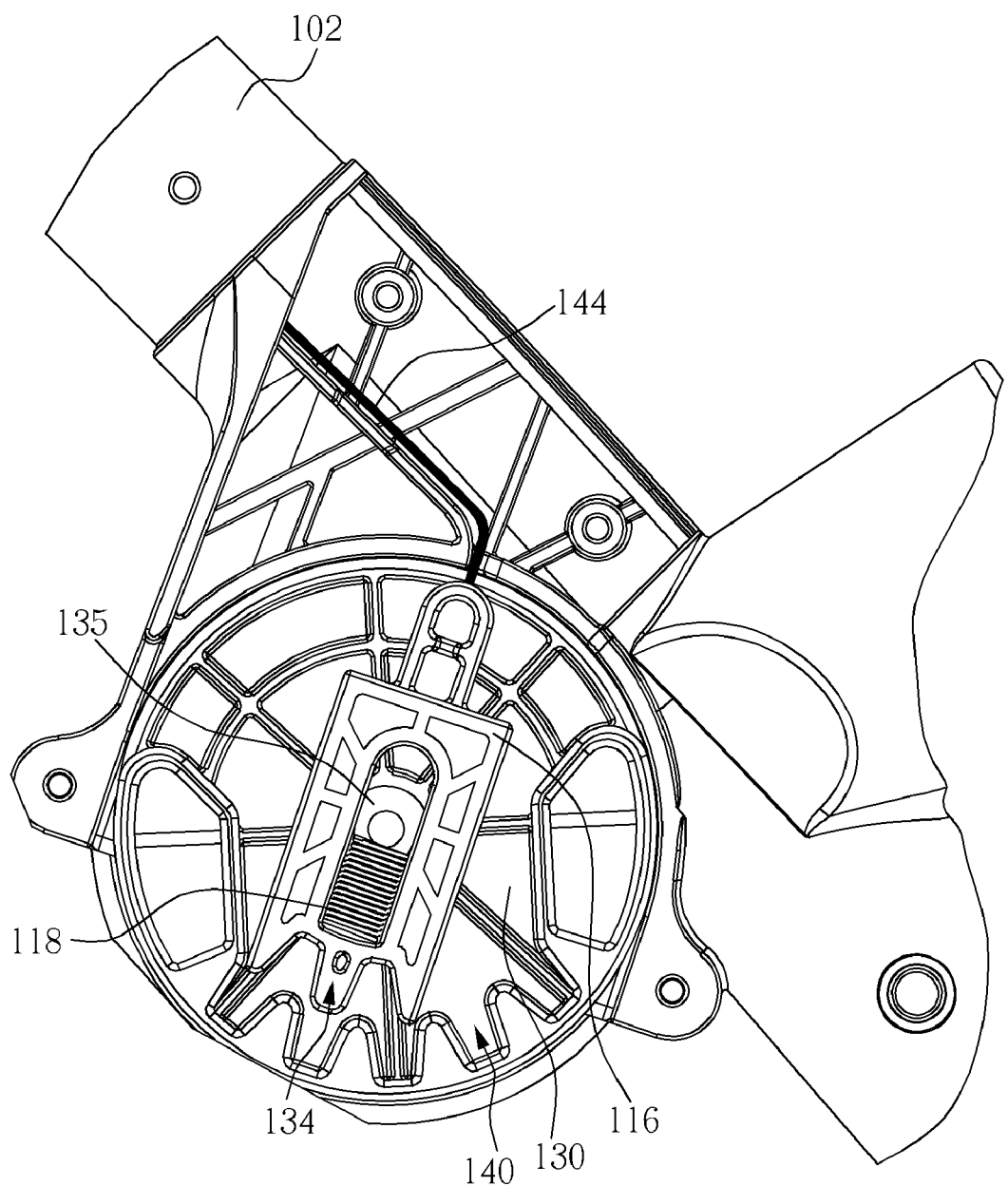
FIG. 17 is a schematic view showing that the engaging tooth disengages from the tooth engaging groove in FIG. 15.

Next, more detailed description for angle adjustment of the seat frame 102 is provided as follows. Please refer to FIG. 15. FIG. 15 is a side view showing the seat assembly mechanism 100 in FIG. 11. As shown in FIG. 15, the outer side wall of positioning-device recipient 138 is formed with a plurality of tooth engaging grooves 140 corresponding to the engaging tooth 134. The engaging tooth 134 of the positioning slider 116 is engaged with one of the plurality of tooth engaging grooves 140 for fixing the seat frame 102 to a corresponding inclined position. Furthermore, the seat frame 102 comprises an actuating mechanism 142 (as shown in FIG. 16) for driving the positioning slider 116. The actuating mechanism 142 comprises an operating device 143 and a linkage element 144. The linkage element 144 is disposed in the tube of the seat frame 102 for connecting the positioning slider 116 to the operating device 143. That is to say, when the user wants to adjust the inclined angle of the seat frame 102, the user only needs to press the operating device 143 to pull the linkage element 144 so as to move the positioning slider 116 away from the tooth engaging groove 140. Subsequently, when the engaging tooth 134 completely disengages from the tooth engaging groove 140 (as shown in FIG. 17), the positioning pin 109 may be glided along the positioning groove 136 so as to make the seat frame 102 rotate relative to the main frame 106 for adjusting the inclined angle of the seat frame 102. For example, the user can rotate the seat frame 102 counterclockwise relative to the main frame 106 to move the engaging tooth 134 counterclockwise from the tooth engaging groove 140 shown in FIG. 15 to the next adjacent tooth engaging groove 140. Then, the user needs to release the operating device 143. At this moment, the engaging tooth 134 is pushed to insert back into the tooth engaging groove 140 by elastic force provided from the second spring 118. Therefore, the seat frame 102 may be fixed to an adjusted inclined angle by the engagement of the engaging tooth 134 and the tooth engaging groove 140. On the analogy of this, as shown in FIG. 17, the seat frame 102 has three different inclined angles to adjust. However, the number of the engaging tooth 134 and the tooth engaging groove 140 depends on design demands. In other words, more than the said number of engaging teeth 134 and tooth engaging grooves 140 may be disposed on the seat frame 102 for allowing the seat frame 102 to have more inclined angles to adjust. Furthermore, for preventing the seat frame 102 from being over-tilted, as shown in FIG. 12, the positioning-device recipient 138 has a first contact surface 146. The corresponding side of the seat frame 102 has a second contact surface 148. The second contact surface 148 is used for abutting against the first contact surface 146 when the positioning device 104 rotates to a predetermined angle relative to the positioning-device recipient 138. In such a manner, the positioning device 104 may not continue to rotate relative to the positioning-device recipient 138. It should be noted that the said angle limited mechanism can be also formed at another side of the positioning-device recipient 138 opposite to the first contact surface 146 and a corresponding position of the seat frame 102 for constraining the inclined angle of the positioning device 104 rotating toward an opposite direction in the positioning-device recipient 138.

It should be mentioned that the seat frame 102 in this embodiment is also able to face the front or the rear of the stroller 2 as the aforementioned embodiment. That is to say, the seat frame 102 may be disposed on the main frame 106 in a direction as shown in FIG. 8A or FIG. 8D. Furthermore, the seat assembly mechanism 100 not only can be used on an infant seat, but also can be used on an infant carrier 70 (as shown in FIG. 10) or a car seat. In other words, the said equipment may be assembled to the stroller 2 by the seat assembly mechanism 100.

Compared with the prior art, no matter what inclined position the seat frame according to the first embodiment of present invention is disposed in, the seat supporting base always returns to the original horizontal state after the seat frame is disassembled from the seat supporting base. Thus, the seat frame can be vertically inserted downward into the seat supporting base, as the seat frame is mounted on the main frame again. Furthermore, the present invention utilizes the angle adjusting mechanism mentioned above to prevent the seat frame from being over-tilted, thereby preventing the baby in the stroller with its head lower than its feet.

Although the present invention has been described with reference to the preferred embodiment thereof, it is apparent to those skilled in the art that a variety of modifications and changes may be made without departing from the scope of the present invention which is intended to be defined by the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat assembly mechanism for a stroller having a seat frame and a main frame, the seat assembly mechanism comprising:

a positioning device disposed on the seat frame, the positioning device comprising a positioning pin movable between a locking position and a releasing position; and a seat supporting member disposed on the main frame, the seat supporting member comprising a positioning-device recipient corresponding to the positioning device and a positioning groove located at a side of the positioning-device recipient;

wherein the positioning device is detachably assembled to the seat supporting member, the positioning pin inserts into the positioning groove when the positioning device is disposed in the positioning-device recipient of the seat supporting member for assembling the seat frame to the main frame, the positioning device and the seat supporting member are only held together in the locking position by the positioning pin being inserted into the positioning groove, and when the positioning pin completely disengages from the positioning groove, for detaching the positioning device is removable from the positioning-device recipient of the seat supporting member, and the seat frame may be disassembled from the main frame.

2. The seat assembly mechanism of claim 1, wherein the seat supporting member comprises a pivot base and a seat supporting base connected to the pivot base, the positioning groove is disposed on the pivot base, and the positioning-device recipient is disposed on the seat supporting base.

3. The seat assembly mechanism of claim 2, wherein the pivot base has a first connecting surface and a plurality of positioning grooves formed on the first connecting surface, the seat supporting base has a second connecting surface corresponding to the first connecting surface, the first connecting surface is pivotally connected to the second connecting surface so as to allow the seat supporting base to rotate respective to the pivot base, and the positioning pin inserts selectively into one of the plurality of positioning grooves for fixing the position of the seat supporting base relative to the pivot base.

4. The seat assembly mechanism of claim 3, wherein the lower portion of the first connecting surface is formed with a protruding piece, the second connecting surface has a groove and two limiting tabs located at two ends of the groove respectively, the seat supporting member further comprises two springs disposed in the groove, and the protruding piece passes through the groove so that the two springs are disposed between the two limiting tabs and the protruding piece respectively when the first connecting surface couples with the second connecting surface.

5. The seat assembly mechanism of claim 3, wherein the second connecting surface has two limiting tabs, the pivot base further comprises a protruding portion where the plurality of positioning grooves is disposed on, and the protruding portion is abutted against one of the two limiting tabs when the first connecting surface rotates to a predetermined angle relative to the second connecting surface.

6. The seat assembly mechanism of claim 1, wherein the positioning device comprises a button slidably disposed on the seat frame, the button has a first guide slot for allowing the positioning pin to pass through, the first guide slot is formed with a first inclined face, and the positioning pin has a second inclined face corresponding to the first inclined face.

7. The seat assembly mechanism of claim 6, wherein the positioning pin comprises a positioning sleeve and a first positioning rod secured within the positioning sleeve, the positioning sleeve is formed with the second inclined face, and the first positioning rod is protruding from the positioning sleeve and is configured for inserting into the positioning groove.

8. The seat assembly mechanism of claim 7, wherein the fixing sleeve comprises a partition for separating the inner space of the fixing sleeve into a first mounting portion and a second mounting portion, the second mounting portion receives a seat connection portion of the seat frame, and the button is slidably disposed on the first mounting portion.

9. The seat assembly mechanism of claim 6, wherein the positioning device comprises a spring sleeved on the positioning pin and disposed in the seat frame for biasing the positioning pin toward the locking position.

10. The seat assembly mechanism of claim 1, wherein an inclined opening is formed above the positioning groove, and the positioning pin is guided into the positioning groove by the inclined opening when the seat frame is assembled to the main frame.

11. The seat assembly mechanism of claim 1, wherein a plurality of engaging grooves is formed on a side of the seat supporting member, the positioning device comprises a positioning slider slidably disposed on the seat frame, the positioning slider has an engaging part for engaging with one of the plurality of engaging grooves so as to fix the seat frame relative to the main frame in a corresponding tilt position, and the seat frame comprises an actuating mechanism connected to the positioning slider and driving the positioning slider to disengage from the engaging groove.

12. The seat assembly mechanism of claim 11, wherein the positioning-device recipient has a first contact surface, and the seat frame has a second contact surface for abutting against the first contact surface when the positioning device rotates to a predetermined tilt position relative to the positioning-device recipient.

13. The seat assembly mechanism of claim 11, wherein the actuating mechanism comprises a linkage element and an operating device, the positioning slider is connected to one end of the linkage element, and the operating device is connected to the other end of the linkage element for pulling the linkage element so as to drive the positioning slider to disengage from the engaging groove.

14. The seat assembly mechanism of claim 11, wherein the positioning device comprises:
an inner cover connected to the seat frame and having a protruding shaft, the positioning slider being disposed between the inner cover and the seat frame and having a guide slot for the protruding shaft to pass through; and
a spring disposed in the guide slot and abutting against the protruding shaft and the positioning slider for biasing the engaging part engaging with one of the plurality of the engaging grooves.

15. A stroller comprising:
a seat frame comprising a positioning device, the positioning device comprising a positioning pin movable between a locking position and a releasing position; and
a main frame comprising a seat supporting member, the seat supporting member having a positioning-device recipient for removably receiving the positioning device of the seat frame and a positioning groove located at a side of the positioning-device recipient;
wherein when the positioning device is disposed in the positioning-device recipient, the positioning pin is engaged with the positioning groove for fixing the seat frame on the main frame, the positioning device and the seat supporting member are only held together in the locking position by the positioning pin being inserted into the positioning groove, and when the positioning pin completely disengages from the positioning groove, for detaching the positioning device is removable from the positioning-device recipient, and the seat frame may be disassembled from the main frame.

16. The stroller of claim 15, wherein the positioning device comprises a button slidably disposed on the seat frame, the button has a first inclined face, the positioning pin has a second inclined face corresponding to the first inclined face, and the first inclined face pushes the second inclined face to drive the positioning pin to move toward the releasing position when the button is pressed.

17. The stroller of claim 16, wherein the seat supporting member comprises a pivot base and a seat supporting base connected to the pivot base, the positioning groove is disposed on the pivot base, and the positioning-device recipient is disposed on the seat supporting base.

18. The stroller of claim 17, wherein the seat supporting base is pivotally connected to the pivot base for allowing the seat frame to rotate relative to the main frame.

19. The stroller of claim 18, wherein the pivot base has a blocker, the button has a blocking section, and the blocking section is blocked by the blocker so that the seat frame can only rotate relative to the main frame in one direction.

20. The stroller of claim 17, wherein the main frame has a front leg, a handle pivotally connected to the front leg by the pivot base, and a rear leg pivotally connected to the handle.

21. The stroller of claim 15, wherein a plurality of engaging grooves is formed on a side of the seat supporting member, the positioning device comprises a positioning slider slidably disposed on the seat frame, and the positioning slider has an engaging part for engaging with one of the plurality of the engaging grooves so as to fix the seat frame relative to the main frame in a corresponding tilt position.

\* \* \* \* \*

UNITED STATES PATENT AND TRADEMARK OFFICE
CERTIFICATE OF CORRECTION

PATENT NO. : 8,251,382 B2
APPLICATION NO. : 12/134199
DATED : August 28, 2012
INVENTOR(S) : Shun-Min Chen et al.

Page 1 of 1

It is certified that error appears in the above-identified patent and that said Letters Patent is hereby corrected as shown below:

On the Title Page, Item (75), "Ze-Hua Yi, Taipei (TW)" should read -- Ze-Hua Yi, Dongguan (CN) --.

In The Claims

In claim 1, column 10, lines 61-63, "for detaching the positioning device is removable from the positioning-device recipient of the seat supporting member" should read -- the positioning device is removable from the positioning-device recipient of the seat supporting member --.

In claim 15, column 12, lines 43-44, "for detaching the positioning device is removable from the positioning-device recipient" should read -- the positioning device is removable from the positioning-device recipient --.

Signed and Sealed this
Nineteenth Day of July, 2016

Michelle K. Lee
*Director of the United States Patent and Trademark Office*